US011804724B2

(12) United States Patent
Nook et al.

(10) Patent No.: US 11,804,724 B2
(45) Date of Patent: *Oct. 31, 2023

(54) RECHARGEABLE JUMP STARTING DEVICE HAVING A HIGHLY ELECTRICALLY CONDUCTIVE CABLE CONNECTING DEVICE

(71) Applicant: THE NOCO COMPANY, Glenwillow, OH (US)

(72) Inventors: Jonathan Lewis Nook, Gates Mills, OH (US); William Knight Nook, Sr., Shaker Heights, OH (US); James Richard Stanfield, Glendale, AZ (US); Derek Michael Underhill, Tempe, AZ (US)

(73) Assignee: The Noco Company, Glenwillow, OH (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/091,049

(22) Filed: Nov. 6, 2020

(65) Prior Publication Data
US 2021/0054818 A1    Feb. 25, 2021

Related U.S. Application Data

(63) Continuation of application No. 16/376,545, filed on Apr. 5, 2019, now Pat. No. 10,859,054, which is a
(Continued)

(51) Int. Cl.
*H02J 7/00* (2006.01)
*F02N 11/12* (2006.01)
(Continued)

(52) U.S. Cl.
CPC ............ *H02J 7/0042* (2013.01); *B60L 53/14* (2019.02); *F02N 11/12* (2013.01); *H02J 7/0029* (2013.01);
(Continued)

(58) Field of Classification Search
CPC ...... H02J 7/0029; H02J 7/0042; H02J 7/0054; H02J 7/342; H02J 1/122; H01M 50/543;
(Continued)

(56) References Cited

U.S. PATENT DOCUMENTS

| 4,895,530 A | 1/1990 | Gugelmeyer et al. |
| 5,083,076 A | 1/1992 | Scott |

(Continued)

FOREIGN PATENT DOCUMENTS

| CN | 104300181 | 1/2015 |
| CN | 206004393 | 3/2017 |

(Continued)

OTHER PUBLICATIONS

European Patent Office, Examination Report, Application No. 18850210, dated Oct. 14, 2022.
(Continued)

*Primary Examiner* — Edward Tso
*Assistant Examiner* — Aaron Piggush
(74) *Attorney, Agent, or Firm* — Jones Day

(57) ABSTRACT

A rechargeable battery jump starting device having detachable positive and negative cables. The rechargeable battery jump starting device, including a rechargeable battery connected to a positive cam-lock cable connecting device and a negative cam-lock cable connecting device. The rechargeable battery jump starting device can include a highly electrically conductive frame connecting the rechargeable battery to the cam-lock cable devices.

18 Claims, 33 Drawing Sheets

Related U.S. Application Data continuation of application No. PCT/US2018/003502, filed on May 30, 2018.

(60) Provisional application No. 62/562,713, filed on Sep. 25, 2017, provisional application No. 62/561,751, filed on Sep. 22, 2017, provisional application No. 62/552,065, filed on Aug. 30, 2017.

(51) Int. Cl.

| | | |
|---|---|---|
| *B60L 53/14* | (2019.01) | |
| *H02J 7/34* | (2006.01) | |
| *H01R 11/24* | (2006.01) | |
| *H01R 13/213* | (2006.01) | |
| *F02N 19/00* | (2010.01) | |
| *H01R 4/36* | (2006.01) | |
| *H01R 101/00* | (2006.01) | |
| *F02N 11/14* | (2006.01) | |
| *H01R 24/20* | (2011.01) | |
| *H02J 1/10* | (2006.01) | |
| *H01M 50/543* | (2021.01) | |
| *F02N 11/08* | (2006.01) | |
| *H01M 10/0525* | (2010.01) | |

(52) U.S. Cl.
CPC ............ *H02J 7/342* (2020.01); *F02N 11/087* (2013.01); *F02N 11/14* (2013.01); *F02N 19/00* (2013.01); *H01M 10/0525* (2013.01); *H01M 50/543* (2021.01); *H01M 2220/20* (2013.01); *H01R 4/36* (2013.01); *H01R 11/24* (2013.01); *H01R 13/213* (2013.01); *H01R 24/20* (2013.01); *H01R 2101/00* (2013.01); *H02J 1/122* (2020.01)

(58) Field of Classification Search
CPC .......... B60L 53/14; F02N 11/12; F02N 11/14; F02N 11/087; F02N 19/00
USPC ................................ 320/103, 104, 105, 107
See application file for complete search history.

(56) References Cited

U.S. PATENT DOCUMENTS

| | | | | |
|---|---|---|---|---|
| 5,985,481 | A * | 11/1999 | Champagne | H01M 6/38 |
| | | | | 439/759 |
| 6,206,714 | B1 | 3/2001 | Bernardini | |
| 6,623,315 | B1 * | 9/2003 | Roderick | H01R 4/18 |
| | | | | 439/772 |
| 7,081,001 | B1 | 7/2006 | Conroy et al. | |
| 7,348,510 | B1 | 3/2008 | Foley et al. | |
| 10,414,277 | B1 * | 9/2019 | Herron | H02J 7/342 |
| 10,859,054 | B2 * | 12/2020 | Nook | H02J 7/342 |
| 2001/0025618 | A1 * | 10/2001 | Kelling | F02N 11/14 |
| | | | | 123/179.28 |
| 2004/0121225 | A1 * | 6/2004 | Krieger | H02J 7/0045 |
| | | | | 429/96 |
| 2005/0040788 | A1 | 2/2005 | Tseng | |
| 2007/0047181 | A1 | 3/2007 | Herbstritt et al. | |
| 2015/0349533 | A1 | 12/2015 | Feuerstack | |
| 2015/0349553 | A1 * | 12/2015 | Chapple | H01R 11/24 |
| | | | | 320/105 |
| 2016/0197381 | A1 | 7/2016 | Kamada et al. | |
| 2016/0329731 | A1 * | 11/2016 | Kokot, Jr. | H02J 7/345 |
| 2018/0062197 | A1 * | 3/2018 | Thiel | H05K 1/181 |
| 2019/0173305 | A1 * | 6/2019 | Nook | H01M 10/441 |
| 2019/0222042 | A1 * | 7/2019 | Nook | H02J 7/00032 |
| 2021/0296913 | A1 * | 9/2021 | Nook | H02J 7/0045 |

FOREIGN PATENT DOCUMENTS

| | | |
|---|---|---|
| JP | H08-285897 | 11/1996 |
| JP | H10-312839 | 11/1998 |
| JP | 2004-274839 | 9/2004 |
| JP | 2015-046311 | 3/2015 |
| JP | 2016-046857 | 4/2016 |
| WO | WO 2017/138963 | 8/2017 |
| WO | WO 2017/139524 | 8/2017 |

OTHER PUBLICATIONS

IP Australia, Appl. 2018326243, Examination Report No. 1, dated Nov. 9, 2020.
Canadian Patent Office, Appl. 3,072,566, Examiner Requisition, dated Mar. 31, 2021.
Canadian Patent Office, Appl. 3,072,566, Examiner Requisition, dated Nov. 19, 2021.
CNIPA, Appl. 201880054810.1. Office Action, dated Nov. 29, 2021.
CNIPA, Appl. 201880054810.1, Rejection Decision, dated Apr. 19, 2022.
European Patent Office, U.S. Appl. No. 18/850,210, Search Report, dated Jul. 20, 2020.
European Patent Office, U.S. Appl. No. 18/850,210, Examination Report, dated Oct. 14, 2022.
Japan Patent Office, Appl. 2020-508325, Office Action, dated Apr. 6, 2021.
Japan Patent Office, Appl. 2020-508325, Decision of Rejection, dated Nov. 24, 2021.
Japan Patent Office, Appl. 2020-508325, Appeal Examiner's Report, Jun. 6, 2022.
Patent Cooperation Treaty, PCT/US2018/035029, International Search Report and Written Opinion, dated Aug. 3, 2018.
IP Australia, Appl. 2022200916, Examination Report No. 1, dated Apr. 24, 2023.
Japan Patent Office, Appl. 2022-047302, Office Action, dated Jun. 13, 2023.
IP Australia, Appl. 2022200916, Examination Report No. 2, dated Jul. 7, 2023.

\* cited by examiner

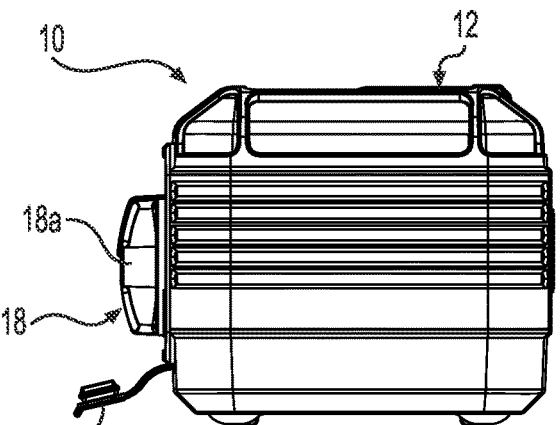
FIG. 5
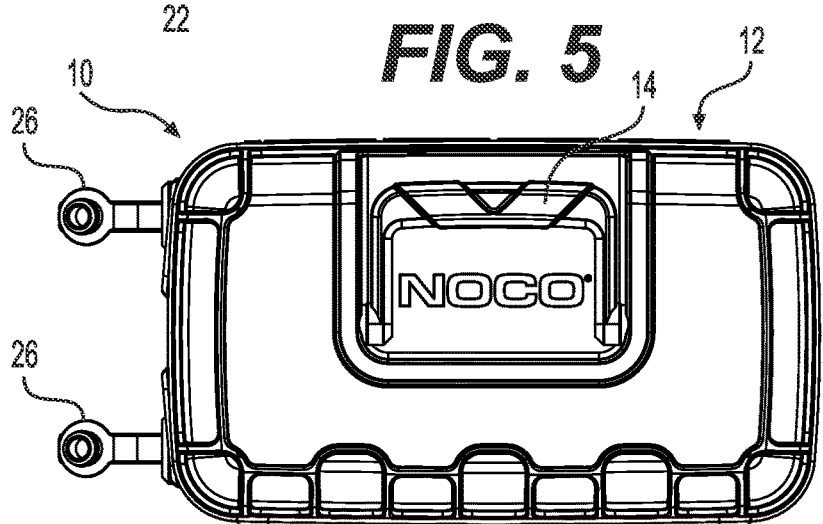
FIG. 6
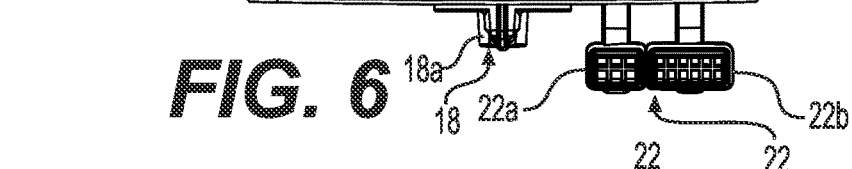
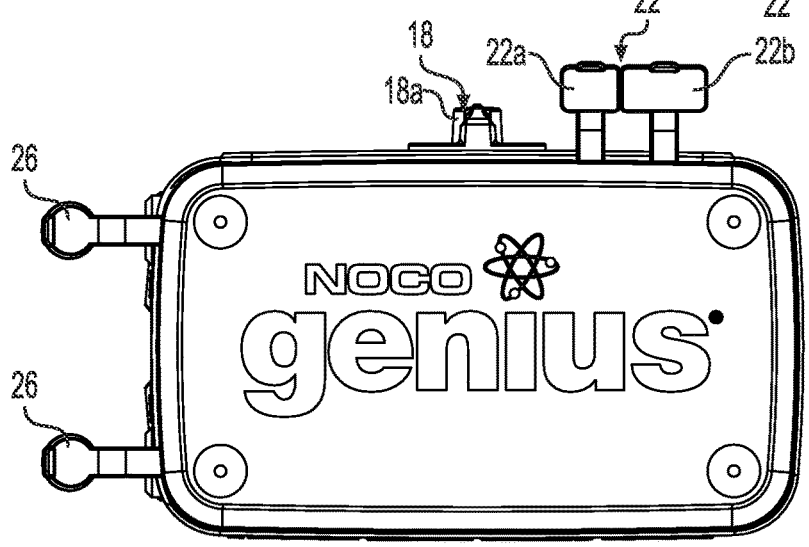
FIG. 7

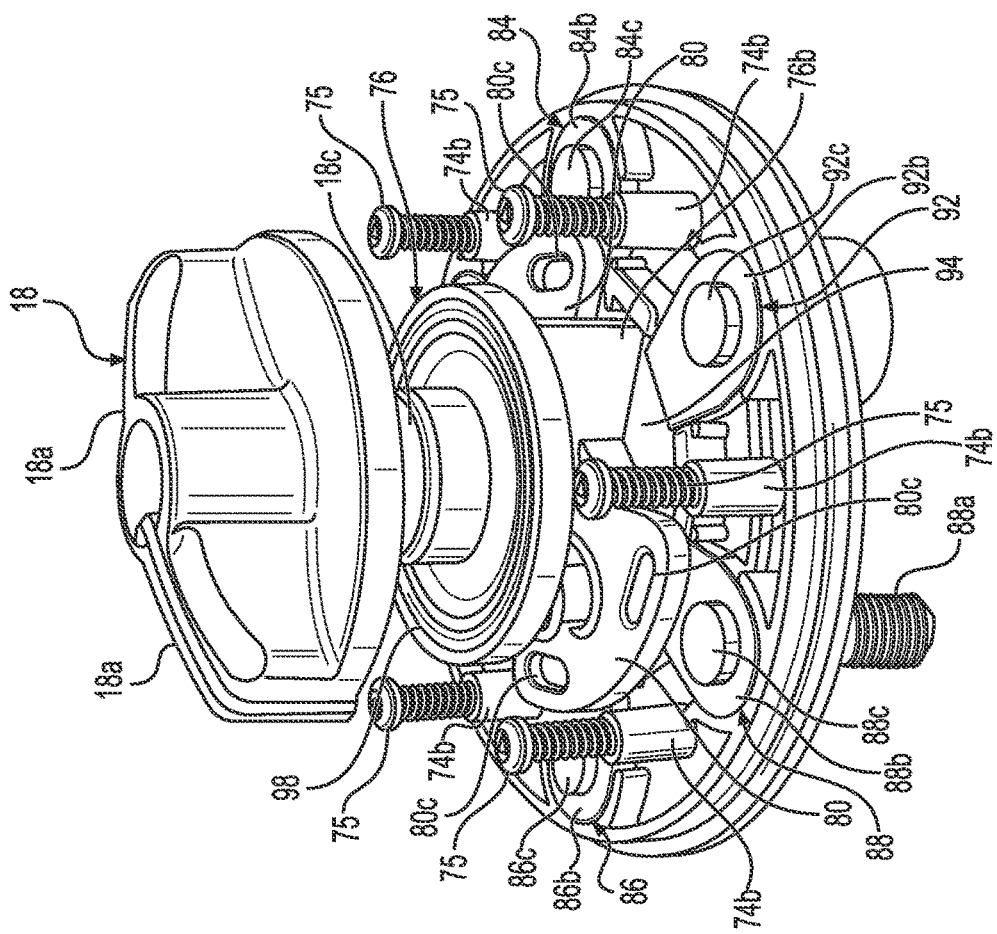
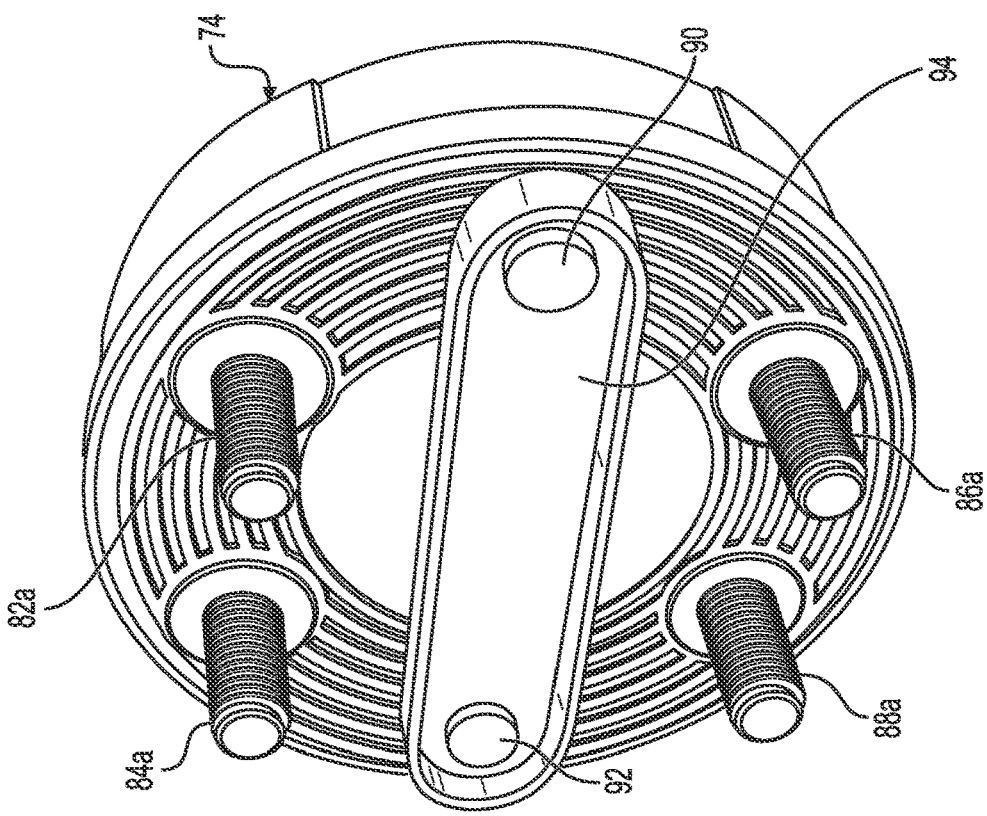

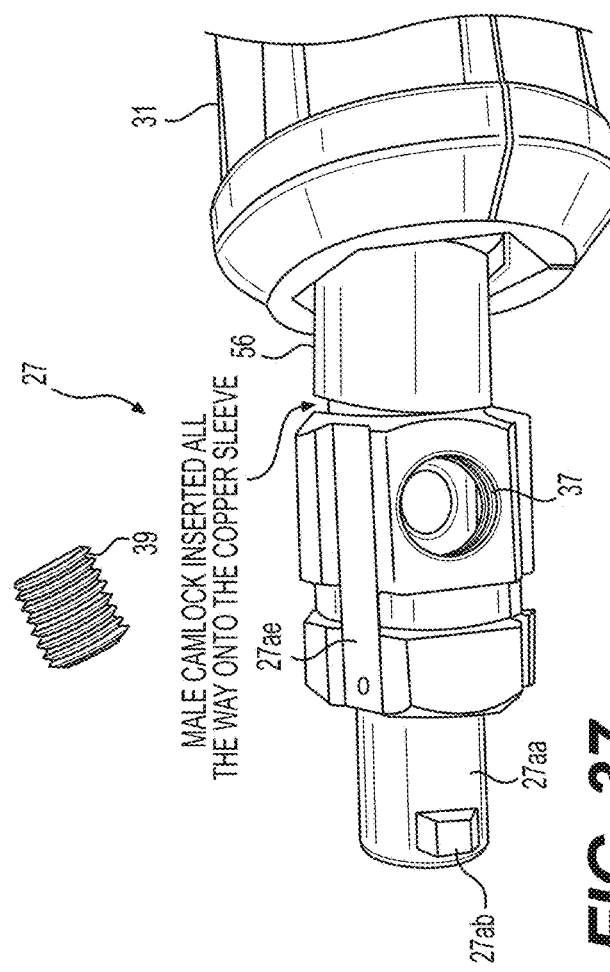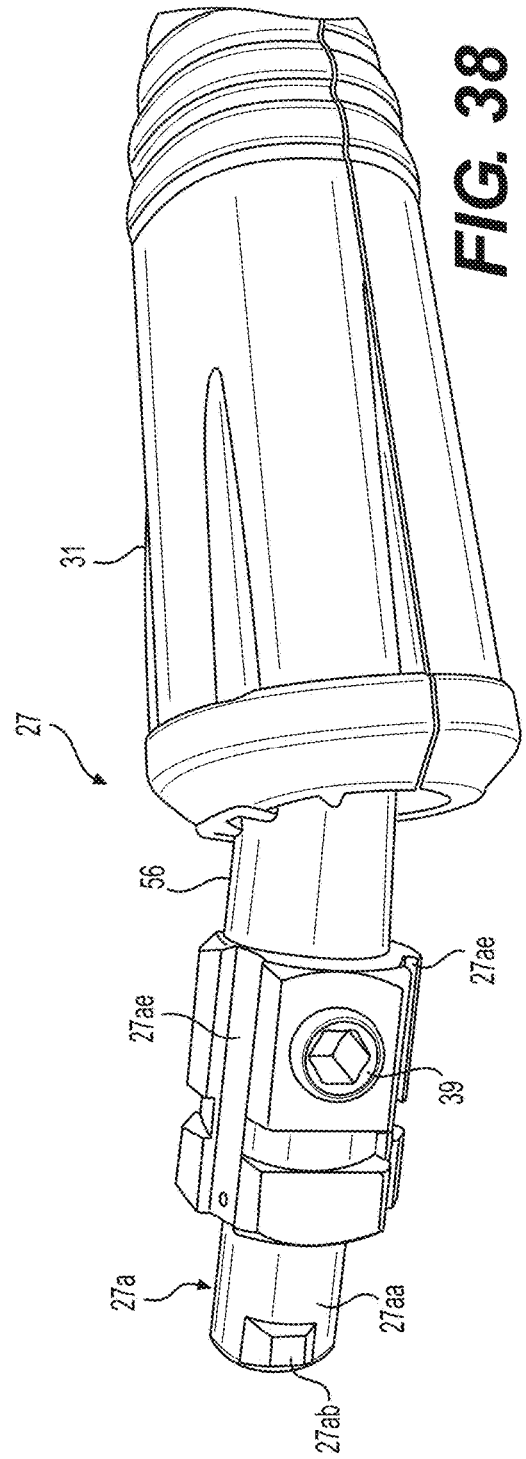

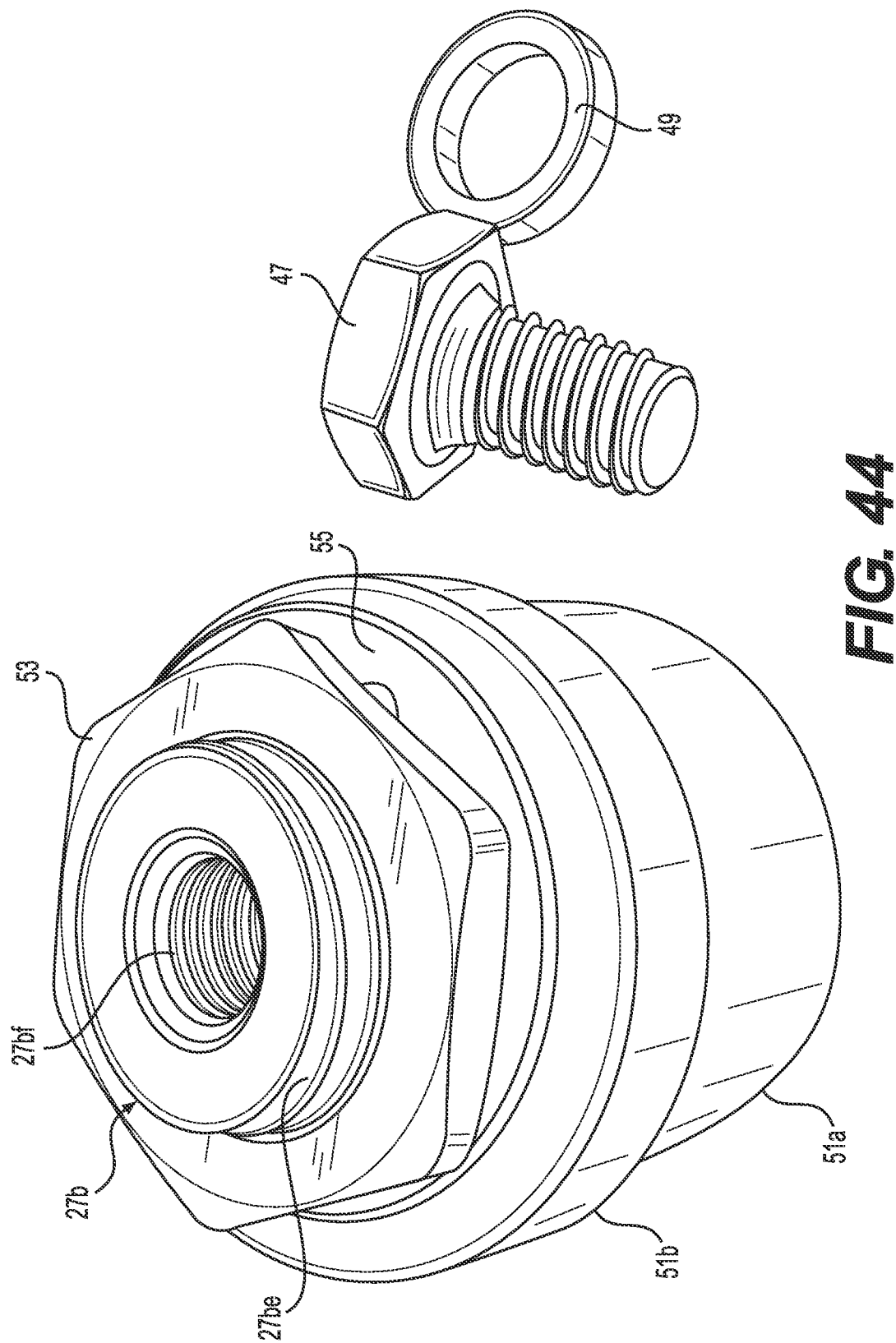

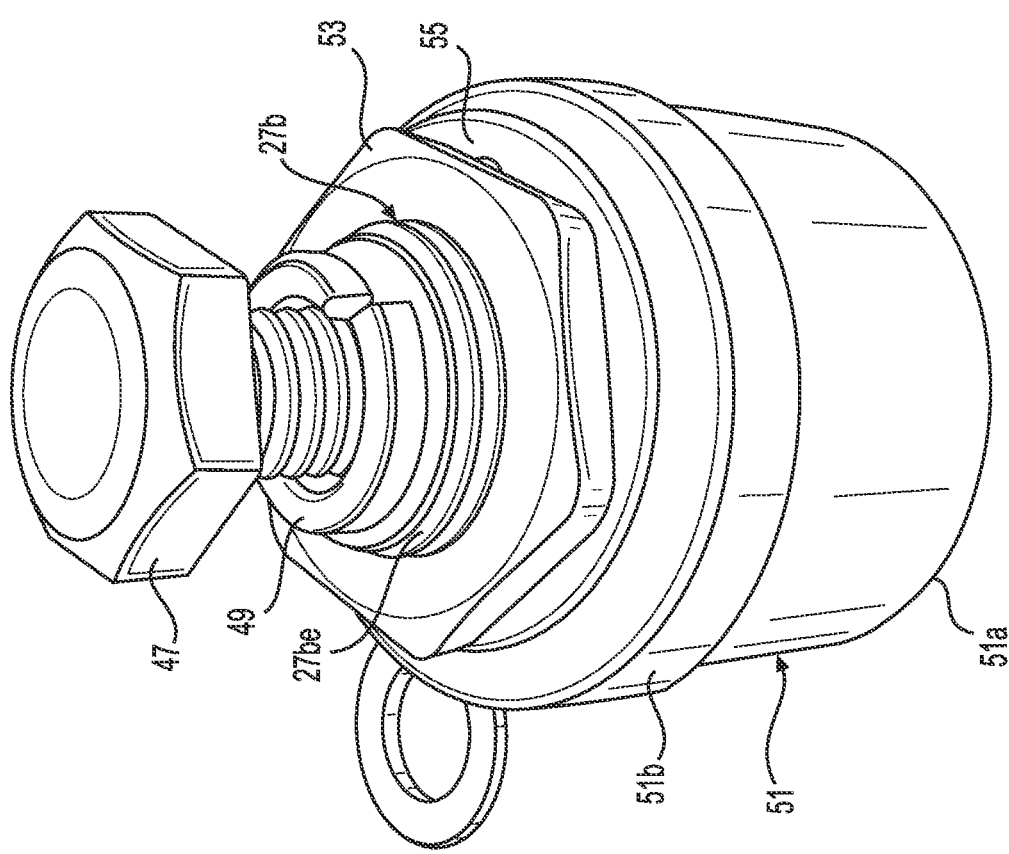

RECHARGEABLE JUMP STARTING DEVICE HAVING A HIGHLY ELECTRICALLY
CONDUCTIVE CABLE CONNECTING
DEVICE

CROSS-REFERENCE TO RELATED
APPLICATIONS

This application is a continuation of application Ser. No. 16/376,545, which issued as U.S. Pat. No. 10,859,054, which is a continuation of PCT/US2018/003502, which claims priority from provisional applications 62/562,713, 62/561,751, and 62/552,065.

FIELD

The present invention is directed to a rechargeable jump starting device having a highly electrically conductive cable connecting device (e.g. cam-lock battery cable connecting devices) for detachably connecting positive and negative battery cables to the rechargeable jump starting device. For example, the rechargeable battery jump starting device is for use in jump starting batteries of automobiles, trucks, heavy equipment, commercial vehicles, commercial equipment, buses, commercial trucks, front loaders, dozers, back hoes, excavators, rollers, fork lift, specialized commercial equipment, logging equipment, airplanes, jets, boats, and other vehicles or equipment using a starting battery.

BACKGROUND

There exists U.S. Pat. No. 9,007,015 filed Jul. 8, 2014 to Nook et al. entitled Portable Vehicle Battery Jump Start Apparatus with Safety Protection. This battery jump start apparatus utilizes a lithium ion battery pack. In this type of apparatus, there exists a need to maximize conductivity from the battery pack of the apparatus to the vehicle battery of the vehicle being jump started. For successful vehicle jump-starts, there are two main factors dictating the results. The first factor is the amount of power provided by the lithium ion battery pack, and the second factor is the maximum conductivity. You need both factors to have the best chance to jump-start big engines. One factor without the other factor is not enough.

Further, there exists PCT application no. PCT/US2016/024680 filed on 29 Mar. 2016 (published 17 Aug. 2017 as WO 2017/138963 A1) entitled Battery Assembly Device. The battery assembly device disclosed provides an enhanced electrically conductive battery assembly for use, for example, in a battery jump start apparatus.

In addition, there exists PCT application no. PCT/US2017/017289 filed on 10 Feb. 2017 (published 17 Aug. 2017 as publication no. WO 2017/139524 A1) entitled Battery Connector Device for a Battery Jump Starting Device. The battery assembly device disclosed provides an enhanced electrically conductive battery assembly for use, for example, in a battery jump start apparatus.

Also, currently there exist heavy duty battery jump starters using conventional lead acid batteries. The jump starters are heavy in weight (e.g. hundreds of pounds) and large dimensionally requiring the jump starter to be moved around using a fork lift. Thus, the current battery jump starters are not portable in any manner.

There exists a need for an improved portable battery jump starting device having significantly increased power output (i.e. high power output), reduced weight, and reduced size to replace conventional units.

There also exists a need for an improved portable battery jump starting device having detachable cables (e.g. positive cable, negative cable) to reduce the overall weight of the portable battery jump starting devices when moving or transporting same, and to make storage of the portable battery jump starting device and cables easier and more convenient. For a portable jump starting device having a high power output, the cable connectors for making the cables detachable must be configured and designed to handle high power output from the portable jump starting device through the connectors to the detachable cables (e.g. battery cables).

SUMMARY

The presently described subject matter is directed to an electrical cable connecting device.

The presently described subject matter is directed to a battery cable connecting device.

The presently described subject matter is directed to a highly electrically conductive cable connecting device.

The presently described subject matter is directed to a highly electrically conductive battery cable connecting device.

The presently described subject matter is directed to an improved electrical cable connecting device.

The presently described subject matter is directed to an improved battery cable connecting device.

The presently described subject matter is directed to an improved highly electrically conductive battery cable connecting device.

The presently described subject matter is directed to a cam-lock electrical cable connecting device.

The presently described subject matter is directed to a cam-lock battery cable connecting device.

The presently described subject matter is directed to a battery assembly comprising or consisting of one or more batteries such as rechargeable batteries connected to a battery frame for use, for example, in a rechargeable battery jump starting device.

The presently described subject matter is directed to a battery assembly comprising or consisting of one or more batteries such as rechargeable batteries connected to a battery frame comprising one or more electrical components or parts.

The presently described subject matter is directed to a battery assembly comprising or consisting of one or more batteries such as rechargeable batteries connected to a battery frame comprising one or more cable connectors.

The presently described subject matter is directed to a battery assembly comprising or consisting of one or more batteries such as rechargeable batteries connected to a battery frame comprising one or more cam-lock cable connectors.

The presently described subject matter is directed to an improved battery jump starting device.

The presently described subject matter is directed to an improved rechargeable battery jump starting device.

The presently described subject matter is directed to a heavy duty rechargeable jump starting device.

The presently described subject matter is directed to a battery jump starting device comprising or consisting of one or more batteries connected to one or more cable connectors for detachably connecting one or more battery cables.

The presently described subject matter is directed to a rechargeable battery jump starting device comprising or consisting of one or more rechargeable batteries connected to one or more battery cable connectors for detachably connecting one or more battery cables.

The presently described subject matter is directed to a battery jump starting device comprising or consisting of one or more batteries connected to a conductive frame having one or more battery cable connectors for detachably connecting one or more battery cables.

The presently described subject matter is directed to a battery jump starting device comprising or consisting of one or more batteries connected to a conductive frame having one or more battery cable cam-lock connectors for detachably connecting one or more battery cables.

The presently described subject matter is directed to a battery jump starting device comprising or consisting of one or more batteries connected to a conductive frame having a positive polarity battery cable cam-lock connector for detachably connecting a positive battery cable and a negative polarity battery cable cam-lock connector for detachable connecting a negative battery cable.

The presently described subject matter is directed to a rechargeable battery jump starting device comprising or consisting of one or more rechargeable batteries such as Lithium-ion batteries ("Li-ion") connected to a conductive frame.

The presently described subject matter is directed to a rechargeable battery jump starting device comprising or consisting of one or more rechargeable batteries such as Lithium-ion batteries ("Li-ion") connected to a conductive frame comprising one or more cable connectors.

The presently described subject matter is directed to a battery jump starting device comprising or consisting of one or more Lithium-ion batteries ("Li-ion") connected to a highly electrically conductive frame.

The presently described subject matter is directed to a battery jump starting device comprising or consisting of one or more Lithium-ion batteries ("Li-ion") connected to a highly electrically conductive frame comprising one or more cam-lock cable connectors.

The presently described subject matter is directed to a battery jump starting device comprising or consisting of multiple rechargeable batteries connected to a conductive frame.

The presently described subject matter is directed to a battery jump starting device comprising or consisting of multiple Li-ion batteries connected to a highly electrically conductive frame.

The presently described subject matter is directed to a battery jump starting device comprising or consisting of multiple Li-ion batteries connected to a highly electrically conductive frame.

The presently described subject matter is directed to a battery jump starting device comprising or consisting of a plurality of Li-ion batteries connected to a highly electrically conductive frame comprising one or more cam-lock cable connectors.

The presently described subject matter is directed to a battery jump starting device comprising or consisting of one or more rechargeable batteries connected to a conductive frame configured to at least partially surround the one or more batteries.

The presently described subject matter is directed to a battery jump starting device comprising or consisting of one or more rechargeable batteries connected to a highly electrically conductive rigid frame configured to at least partially surround the one or more rechargeable batteries.

The presently described subject matter is directed to a battery jump starting device comprising or consisting of one or more rechargeable batteries connected to a highly electrically conductive frame configured to fully surround the one or more rechargeable batteries, the highly electrically conductive frame comprising one or more cable connectors.

The presently described subject matter is directed to a battery jump starting device comprising or consisting of one or more rechargeable batteries connected to a highly electrically conductive frame configured to fully surround the one or more rechargeable batteries, the highly electrically conductive frame comprising one or more cable connectors.

The presently described subject matter is directed to a battery jump starting device comprising or consisting of one or more Li-ion batteries connected to a highly electrically conductive frame configured to at least partially surround the one or more Li-ion batteries, the highly electrically conductive frame comprising one or more cable connectors.

The presently described subject matter is directed to a battery jump starting device comprising or consisting of one or more Li-ion batteries connected to a highly electrically conductive frame configured to fully surround the one or more Li-ion batteries, the highly electrically conductive frame comprising one or more cable connectors.

The presently described subject matter is directed to a battery jump starting device comprising one or more Li-ion batteries connected to a conductive frame configured to fully surround the one or more batteries.

The presently described subject matter is directed to a battery jump starting device comprising or consisting of one or more rechargeable batteries connected to a rigid highly electrically conductive frame.

The presently described subject matter is directed to a battery jump starting device comprising or consisting of one or more rechargeable batteries connected to a rigid highly electrically conductive frame comprising one or more highly electrically conductive frame members.

The presently described subject matter is directed to a battery jump starting device comprising or consisting of one or more rechargeable batteries connected to a highly electrically conductive frame comprising one or more highly electrically conductive frame members and one or more highly electrically conductive cable connectors.

The presently described subject matter is directed to a battery jump starting device comprising or consisting of one or more rechargeable batteries connected to a highly electrically conductive frame comprising one or more highly electrically conductive conductors such as metal wire, rod, bar and/or tubing.

The presently described subject matter is directed to a battery jump starting device comprising or consisting of one or more rechargeable batteries connected to a highly electrically conductive frame comprising one or more electrical conductors such as Copper (Cu) or Aluminum (Al) plate, bar, rod, and/or tubing.

The presently described subject matter is directed to a battery jump starting device comprising or consisting of one or more rechargeable batteries connected to a highly conductive rigid frame comprising one or more rigid highly electrically conductive conductors such as Copper (Cu) or Aluminum (Al) plate, bar, rod, and/or tubing.

The presently described subject matter is directed to a highly electrically conductive cam-lock cable connecting device.

The presently described subject matter is directed to a highly electrically conductive cam-lock cable connecting device in combination with a battery jump starting device.

The presently described subject matter is directed to a highly electrically conductive cam-lock cable connecting device in combination with a battery jump starting device according to the present invention.

The presently described subject matter is directed to a highly electrically conductive cam-lock cable connecting device comprising a male cam-lock end detachably connected to a female cam-lock end.

The presently described subject matter is directed to a highly electrically conductive cam-lock electrical connecting device, comprising or consisting of a highly electrically conductive male cam-lock end; a highly electrically conductive female cam-lock end; and a highly electrically conductive connecting arrangement between the male cam-lock end and the female cam-lock for conducting electrical power therebetween when coupled together.

The presently described subject matter is directed to a highly electrically conductive cam-lock cable connecting device, comprising or consisting of a highly electrically conductive male cam-lock end; a highly electrically conductive female cam-lock end; and a highly electrically conductive connecting arrangement between the male cam-lock end and the female cam-lock for conducting electrical power therebetween when coupled together, wherein the connecting arrangement is configured to tighten when the male cam-lock end is rotated within the female cam-lock device.

The presently described subject matter is directed to a highly electrically conductive cam-lock cable connecting device, comprising or consisting of an electrical highly electrically conductive male cam-lock end; a highly electrically conductive female cam-lock end; and a highly electrically conductive connecting arrangement between the male cam-lock end and the female cam-lock end for conducting electrical power therebetween when coupled together, wherein the male cam-lock device and female cam-lock are made of highly electrically conductive material.

The presently described subject matter is directed to a highly conductive cam-lock electrical connecting device, comprising or consisting of a highly electrical conductive male cam-lock end; a highly electrical conductive female cam-lock end; and a highly electrically conductive connecting arrangement between the male cam-lock end and the female cam-lock end for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end.

The presently described subject matter is directed to a highly electrically conductive cam-lock cable connecting device, comprising or consisting of a highly electrically conductive male cam-lock end; a highly electrically conductive female cam-lock end; and a highly electrically conductive connecting arrangement between the male cam-lock end and the female cam-lock end for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the receptacle of the female cam-lock end is provided with internal threading for cooperating with the tooth of the male cam-lock end.

The presently described subject matter is directed to a highly electrically conductive cam-lock electrical connecting device, comprising or consisting of a highly electrically conductive male cam-lock end; a highly electrically conductive female cam-lock end; and a highly electrically conductive connecting arrangement between the male cam-lock end and the female cam-lock end for conducting electrical power therebetween when coupled together, wherein the male cam-lock device and female cam-lock are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the receptacle of the female cam-lock end is provided with internal threading for cooperating with the tooth of the male cam-lock end, wherein the male cam-lock end includes an end face portion and the female cam-lock end includes an end face portion, wherein the end face portions engage each other when the cam-lock connection device is fully tightened.

The presently described subject matter is directed to a highly electrically conductive cam-lock electrical connecting device, comprising or consisting of an highly electrically conductive male cam-lock end; a highly electrically conductive female cam-lock end; and a highly electrically conductive connecting arrangement between the male cam-lock end and the female cam-lock end for conducting electrical power therebetween when coupled together, further comprising a rubber molded cover fitted over the male cam-lock end and another rubber molded cover fitted over the female cam-lock end.

The presently described subject matter is directed to a highly electrically conductive cam-lock connecting device, comprising or consisting of a highly electrically conductive male cam-lock end; a highly electrically conductive female cam-lock end; and a highly electrically conductive connecting arrangement between the male cam-lock end and the female cam-lock end for conducting electrical power therebetween when coupled together, further comprising a rubber molded cover fitted over the male cam-lock end and another rubber molded cover fitted over the female cam-lock end, wherein the female cam-lock end is provided with an outer threaded portion and a nut for securing the rubber molded cover on the female cam-lock end.

The presently described subject matter is directed to a highly electrically conductive cam-lock electrical connecting device, comprising or consisting of a highly electrically conductive male cam-lock end; a highly electrically conductive female cam-lock end; and a highly electrically conductive connecting arrangement between the male cam-lock end and the female cam-lock end for conducting electrical power therebetween when coupled together, further comprising a rubber molded cover fitted over the male cam-lock end and another rubber molded cover fitted over the female cam-lock end, wherein the male cam-lock end is provided with one or more outwardly extending protrusions cooperating with one or more inner slots in the rubber molded cover.

The presently described subject matter is directed to a highly electrically conductive cam-lock electrical connecting device, comprising or consisting of an highly electrically conductive male cam-lock end; a highly electrically conductive female cam-lock end; and a highly electrically conductive connecting arrangement between the male cam-lock end and the female cam-lock end for conducting electrical power therebetween when coupled together, wherein the male cam-lock end and female cam-lock end are made of highly electrically conductive material, wherein the male cam-lock end comprises a pin having a tooth and the female cam-lock end comprises a receptacle provided with a slot, wherein the receptacle is configured to accommodate the pin and tooth of the male cam-lock end, wherein the slot is provided with an inner surface serving as a stop for the tooth of the pin of the female cam-lock end.

The presently described subject matter is directed to a highly electrically conductive cam-lock electrical connecting device, comprising or consisting of an highly electrically conductive male cam-lock end; a highly electrically conductive female cam-lock end; and a highly electrically conductive connecting arrangement between the male cam-lock end and the female cam-lock end for conducting electrical power therebetween when coupled together, further comprising a cable connected to the male cam-lock end.

The presently described subject matter is directed to a highly electrically conductive cam-lock cable connecting device, comprising a highly electrical conductive male cam-lock end; a highly electrically conductive female cam-lock end; and an highly electrically conductive connecting arrangement between the male cam-lock end and the female cam-lock end for conducting electrical power therebetween when coupled together, further comprising a cable connected to the male cam-lock end, wherein the cable is a battery cable.

The presently described subject matter is directed to a highly electrically conductive cam-lock cable connecting device, comprising or consisting of a highly electrically conductive male cam-lock end; a highly electrically conductive female cam-lock end; and a highly electrically conductive connecting arrangement between the male cam-lock end and the female cam-lock end for conducting electrical power therebetween when coupled together, further comprising a cable connected to the male cam-lock end, wherein the cable is a battery cable, wherein the female cam-lock end is connected to a battery jump starting device.

The presently described subject matter is directed to a highly conductive cam-lock electrical connecting device, comprising a highly electrically conductive male cam-lock end; a highly electrically conductive female cam-lock end; and a highly electrically conductive connecting arrangement between the male cam-lock end and the female cam-lock end for conducting electrical power therebetween when coupled together, further comprising a cable connected to the male cam-lock end, wherein the cable is a battery cable, wherein the female cam-lock end is connected to a battery jump starting device, wherein the battery jump starting device comprises a highly electrically conductive rigid frame connected to one or more rechargeable batteries, and wherein the female cam-lock is connected to the highly conductive frame.

The presently described subject matter is directed to a highly electrically conductive cam-lock electrical connecting device, comprising or consisting of an electrical highly conductive male cam-lock end; a highly electrically conductive female cam-lock end; and a highly electrically conductive connecting arrangement between the male cam-lock end and the female cam-lock end for conducting electrical power therebetween when coupled together, further comprising a cable connected to the male cam-lock end, wherein the cable is a battery cable, wherein the female cam-lock end is connected to a battery jump starting device, wherein the battery jump starting device comprises a highly electrically conductive rigid frame connected to one or more rechargeable batteries, and wherein the female cam-lock end is connected to the highly electrically conductive frame, wherein the battery jump starting device, comprising a positive battery cable having a positive battery clamp, the positive battery cable connected to the highly electrically conductive rigid frame; and a negative battery cable having a negative battery clamp, the negative battery cable being connected to the highly electrically conductive rigid frame.

The battery jump starting device according to the present invention is configured to maximize the amount of power transmitted or delivered from the one or more batteries (e.g. Li-ion) to the battery being jump started. This requires a device power circuit having a high or very high conductivity path or pathway from the one or more batteries to the battery clamps. This physically requires the use of high or very high conductivity conductors such as copper or aluminum plates, bars, rods tubing, and/or cables.

The "rigidity" and "strength" of the highly electrically conductive rigid frame provides structurally stability during storage and use of the battery jump starting device. This is important especially during use when high current is flowing through the highly electrically conductive rigid frame potentially heating and softening the rigid frame. It is highly desirable that the highly electrically conductive rigid frame maintains its structurally stability and configuration during such use so as to avoid the risk of contact and electrically shorting with other electrical components of the battery jump starting device. This is especially true when making a compact and portable configuration of the battery jump starting device to allow minimizing distances between electrical components.

BRIEF DESCRIPTION OF DRAWINGS

FIG. 5 is a right side elevational view of the battery jump staring device shown in FIG. 1.

FIG. 6 is a top planar view of the battery jump starting device shown in FIG. 1.

FIG. 7 is a bottom planar view of the battery jump starting device shown in FIG. 1.

FIG. 14 is a rear perspective view of the switch plate shown in FIG. 13.

FIG. 15 is a perspective view of the control switch shown in FIG. 12.

FIG. 37 is a partially assembled perspective view of the male cam-lock end of the cam-lock connecting device shown in FIG. 32.

FIG. 38 is a fully assembled perspective view of the male cam-lock end of the cam-lock connecting device shown in FIG. 32.

FIG. 44 is an assembled perspective end view of the female cam-lock end of the cam-lock connecting device shown in FIG. 32.

FIG. 45 is an assembled perspective end view of the female cam-lock end of the cam-lock connecting device shown in FIG. 32 along with a bolt for connecting to conductor such as a highly conductive frame of the battery jump starting device according to the present invention.

DETAILED DESCRIPTION

Figure 1:
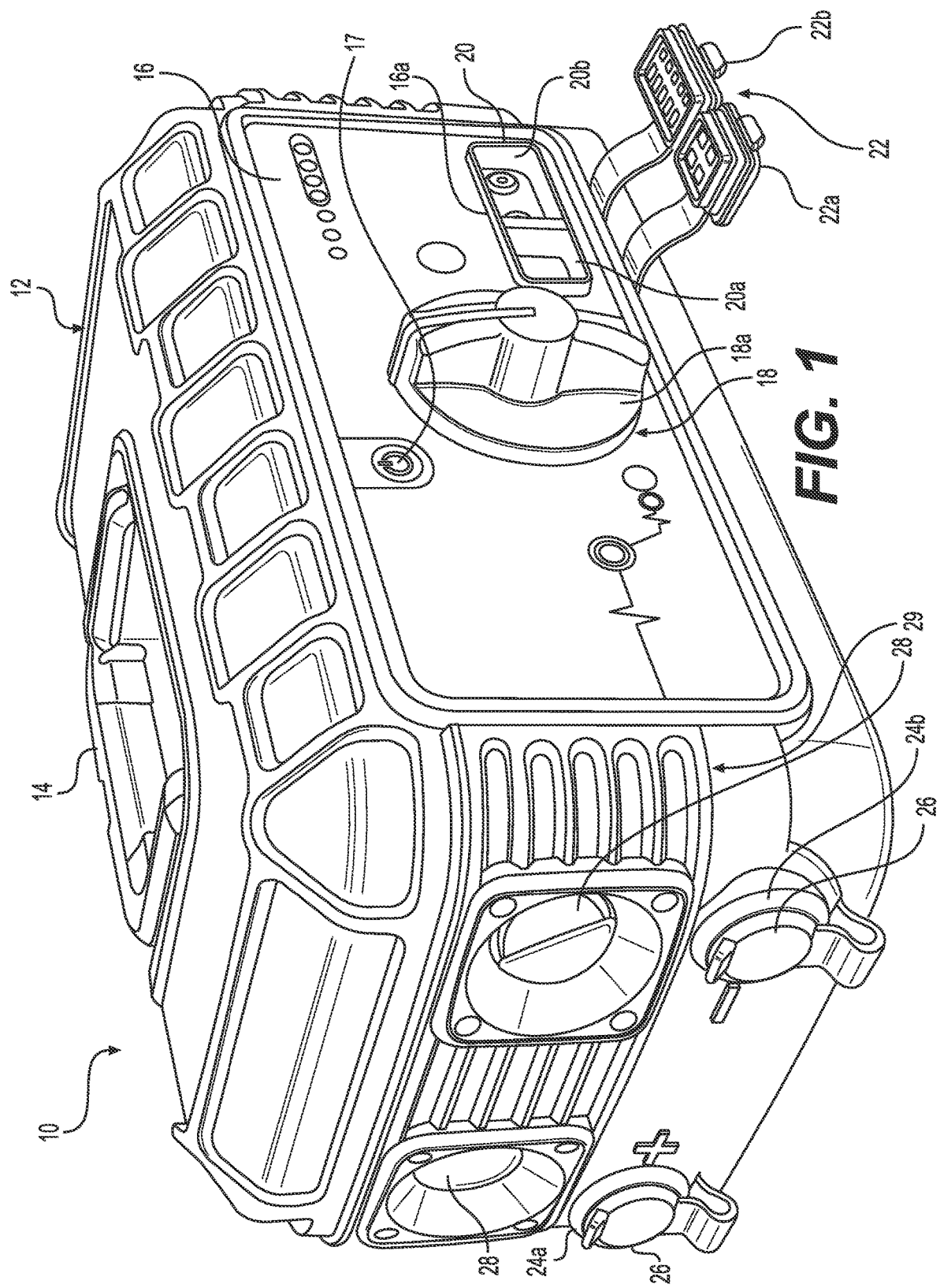
FIG. 1 is a front perspective view of a battery jump starting device according to the present invention.

The battery jump starting device 10 according to the present invention is shown in FIGS. 1-8.

The battery jump starting device 10 comprises a cover 12 fitted with a handle 14, as shown in FIGS. 1-8 and having the particular design shown.

The battery jump starting device 10 comprises a front interface 16 having a power button 17 for turning the power on or off, and a control switch 18 having a control knob 18a for operating the internally located control switch 18. The control switch 18 is configured so that the control knob 18a can be rotated back-and-forth from a first position (12V operating mode) to a second position (24V operating mode) depending on the particular voltage system of the vehicle being jump started (e.g. 12V, 24V).

The interface 16 can be provided with the following features as shown in FIG. 1, including:
1) Power Button 17;
2) Power LED (e.g. White colored LED);
3) 12V Mode LED (e.g. White colored LED);
4) 24V Mode LED (e.g. Blue colored LED);
5) Error LED (e.g. Red colored LED);
6) Cold Error LED (e.g. Blue colored LED);
7) Hot Error LED (e.g. Red colored LED);
8) Internal Battery Fuel Gauge LEDs (e.g. Red, Red, Amber, Green LEDs);
9) Flashlight Mode Button;
10) Flashlight LED (e.g. White colored LED);
11) 12V IN LED (e.g. White/Red LED);
12) 12V OUT LED (e.g. White/Red LED);
13) USB OUT LED (e.g. White LED);
14) Manual Override Button:
15) Manual Override LED Red:
16) Voltmeter Display LED (e.g. White colored LED);
17) 12V Mode LED (e.g. White colored LED);
18) 24V Mode LED (e.g. Blue colored LED); and
19) Boost LED (e.g. White colored LED).

The above features can be modified with different colors, and/or arrangements on the face of the interface 16.

Figure 2:
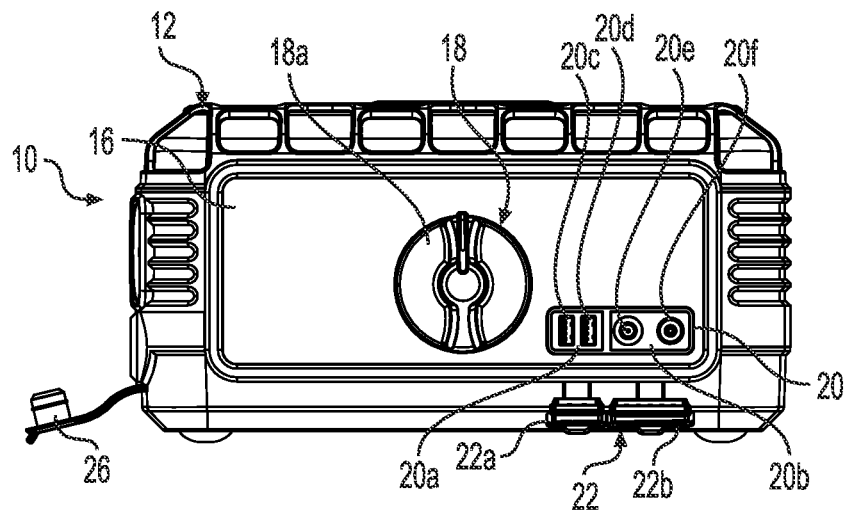
FIG. 2 is a front elevational view of a battery jump starting device shown in FIG. 1.
Figure 3:
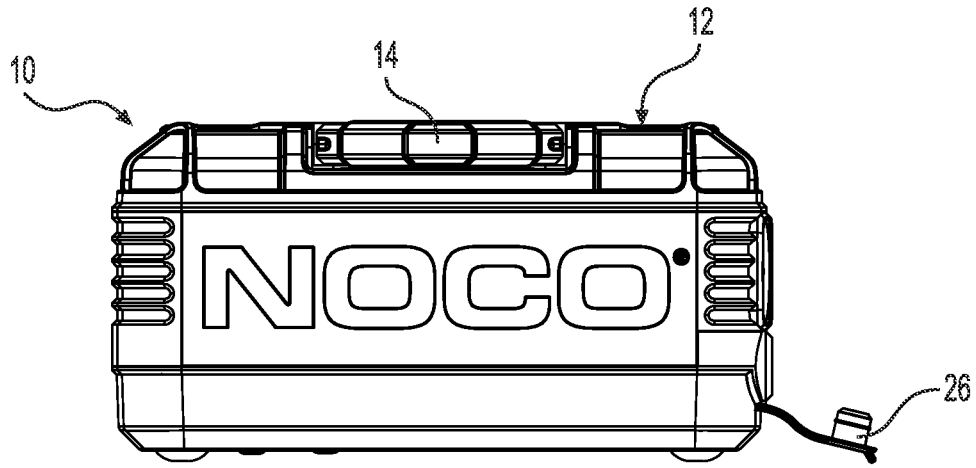
FIG. 3 is a rear elevational view of the battery jump starting device shown in FIG. 1.

The battery jump starting device 10 further comprises a port 20 having left-side port 20a and right-side port 20b. The port 20 is configured to extend through a through hole 16a located in the lower right side of the interface 16. The left-side port 20a accommodates dual 2.1 amp (A) USB OUT ports 20c, 20d and the right-side port 20b accommodates an 18A 12V XGC OUT port 20e and a 5A 12V XGC IN port 20e, as shown in FIG. 2. The cover 12 is provided with the resilient sealing cap 22, including left sealing cap 22a for sealing left port 20a and right sealing cap 22b for sealing right port 20b during non-use of the battery jump starting device 10.

Figure 4:
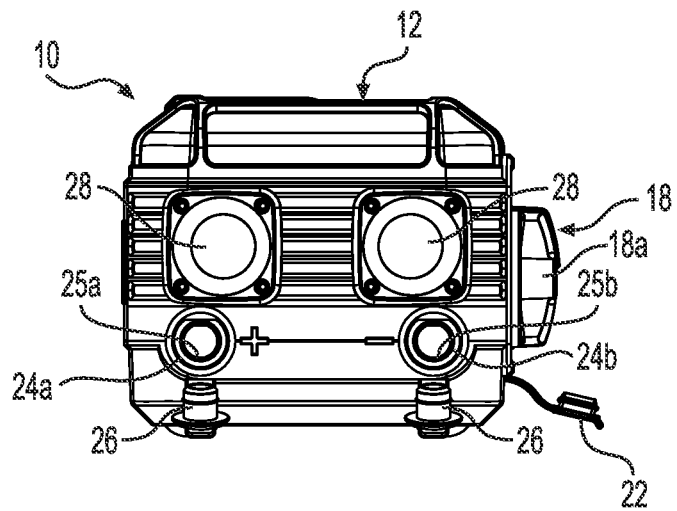
FIG. 4 is a left side elevational view of the battery jump starting device shown in FIG. 1.
Figure 8:
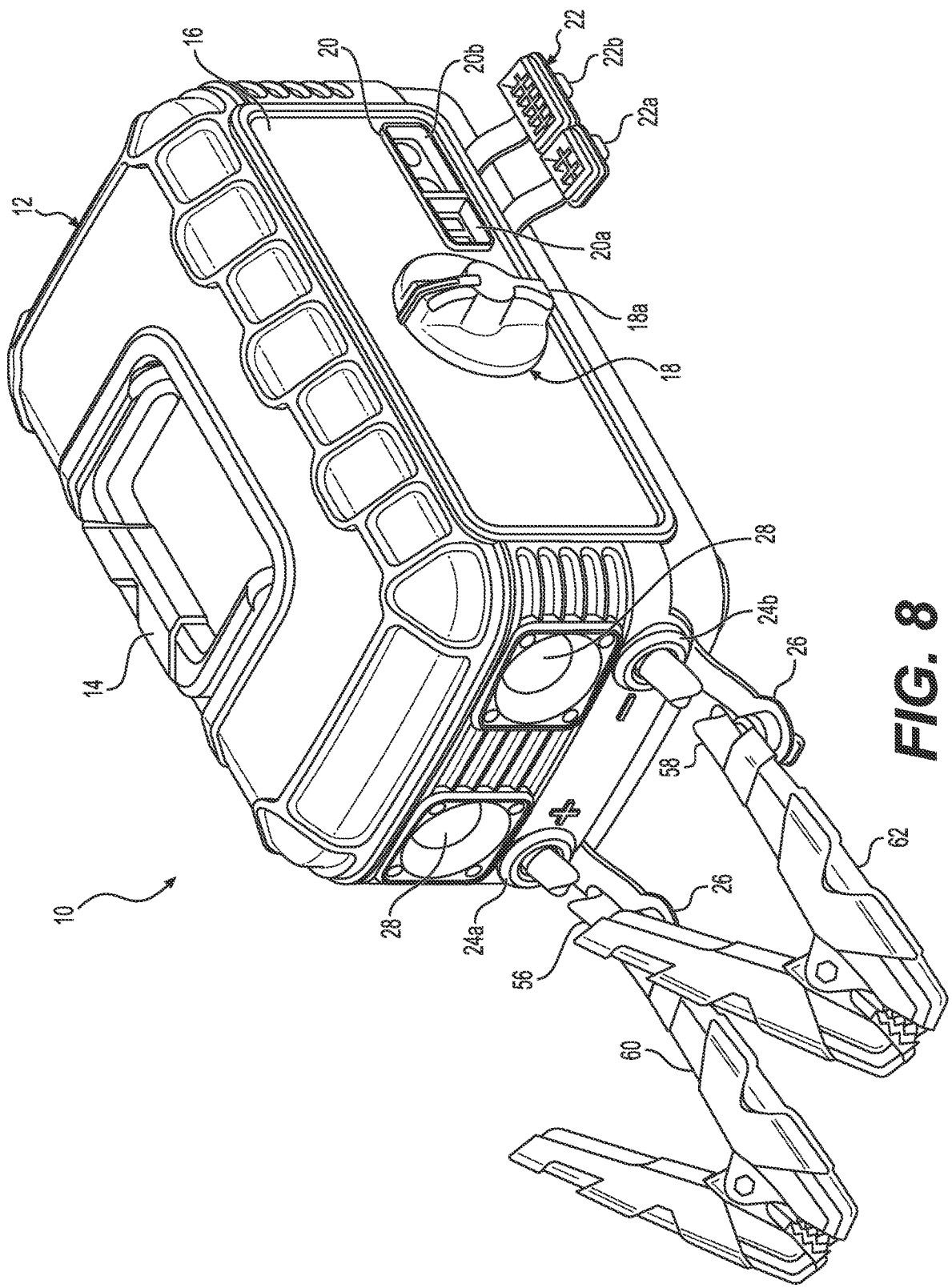
FIG. 8 is a perspective view of the battery jump starting device shown in FIG. 1 with detachable battery cables attached to the battery jump starting device.

The left side of the battery jump starting device 10 is also fitted with a pair of light emitting diodes 28 (LEDS) for using the battery jump starting device 10 as a work light. For example, the LEDs 28 are dual 1100 Lumen high-intensity LED floodlights), as shown in FIGS. 1, 4, and 8. The LEDs 28 are configured to have seven (7) operational modes, including 100% intensity, 50% intensity, 10% intensity, SOS (emergency protocol), Blink, Strobe, and Off.

The battery jump starting device 10 is fitted with a heat sink 29 (FIG. 1) for dissipating heat from the LEDs 28. For example, the heat sink 29 is made of a heat conductive material (e.g. molded or die cast aluminum heat sink). The rib design facilitates the heat sink 29 transferring heat to the surrounding atmosphere to prevent the LEDs 28 from overheating.

The battery jump starting device 10 is shown in FIG. 1 without any battery cables having clamps for connecting the battery jump starting device 10 to a battery of a vehicle to be jump started. The battery jump starting device can be configured to detachably connect to a set of battery cables having battery clamps (e.g. positive battery cable with a positive clamp, negative battery cable with a negative clamp). Alternatively, the battery jump starting device can be fitted with battery cables having clamps hard wired to the device and non-detachable.

Figure 11:
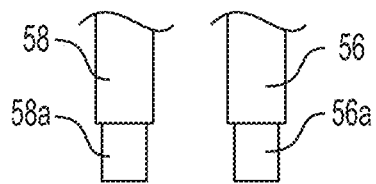
FIG. 11 is a top view of the connection ends of the detachable battery cables shown in FIG. 9.

For example, the left side of the battery jump starting device 10 is provided with a POSITIVE (+) cam-lock 24a and a NEGATIVE (−) cam-lock 24b, as shown in FIG. 4. The cam-locks 24a, 24b include receptacles 25a, 25b configured for detachably connecting with connecting end 56a (FIG. 11) of the positive battery cable 56 and the connecting end 58a of negative battery cable 58, respectively. The cam-locks 24a, 24b are fitted with sealing caps 26 for closing and sealing the receptacles 25a, 25b of the cam-locks 24a, 24b, respectively, during non-use of the battery jump starting device 10, as shown in FIG. 1.

Figure 9:
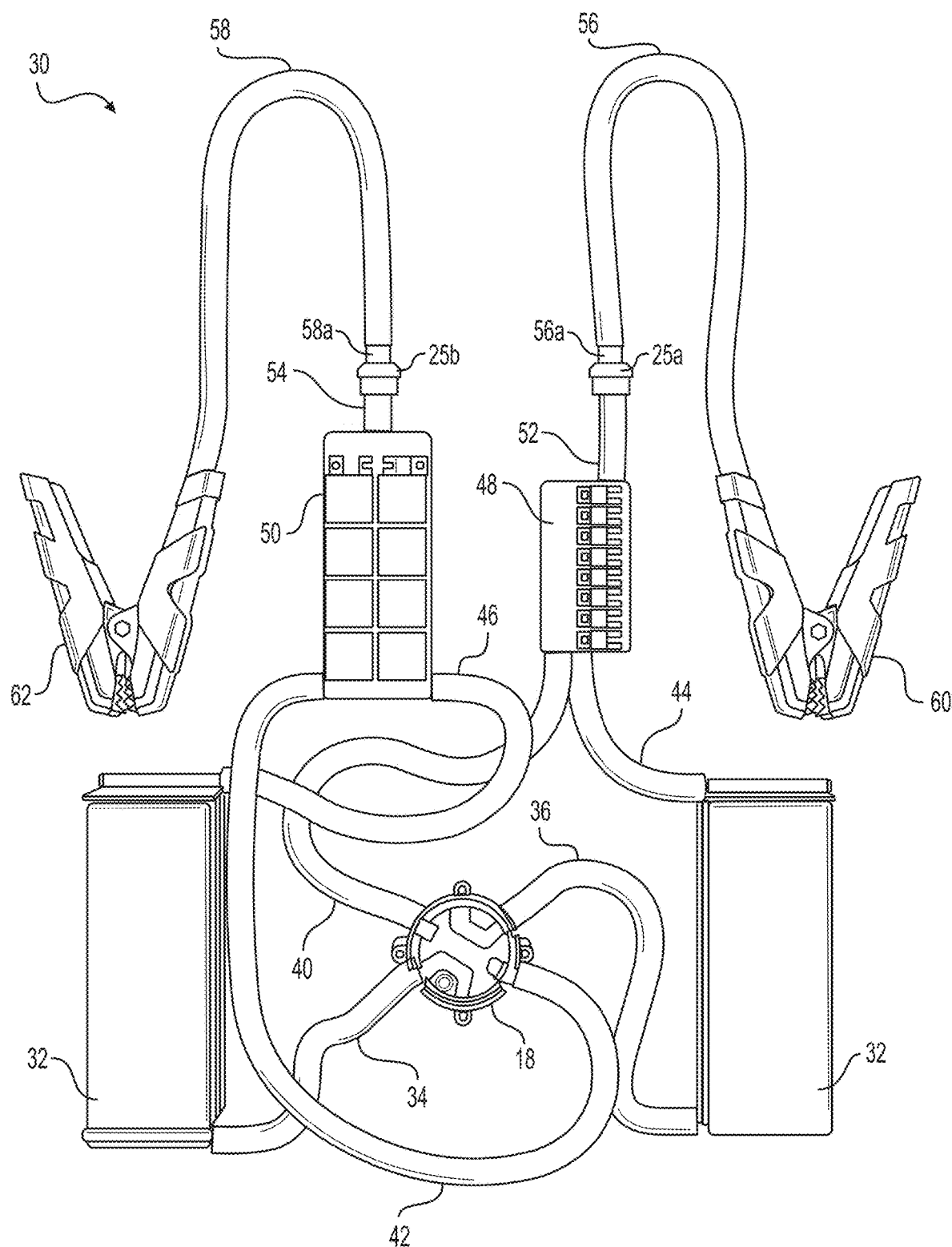
FIG. 9 is a top view of the layout of interior components of the battery jump starting device shown in FIG. 1 having detachable battery cables.

The power circuit 30 of the battery jump starting device 10 is shown in FIG. 9.

The power circuit 30 comprises two (2) separate Lithium ion (Li-ion) batteries 32 (e.g. two (2) 12V Li-ion batteries) connected to the control switch 18 via a pair of cable sections 34, 36 (e.g. insulated copper cable sections), respectively. The control switch 18 is connected to the reverse currently diode array 48 (i.e. reverse flow protection device) via the cable section 40, and the control switch 18 is connected to the smart switch 50 (e.g. 500 A solenoid device) via cable section 42, as shown in FIG. 9.

The reverse current diode array 48 is connected to the one battery 32 via cable section 44, and the smart switch 50 is connected to the other battery 32 via cable section 46, as shown in FIG. 9.

The positive battery cable 56 having a positive battery clamp 60 is detachably connected to the positive cam-lock 24a (FIGS. 1 and 9) connected to the reverse current diode array 48 via cable section 52.

The negative battery cable 58 having a negative battery clamp 62 is detachably connected to the negative cam-lock 24b (FIGS. 1 and 9) connected to the smart switch 50 via cable section 54.

In the above described first embodiment of the power circuit 30, the electrical components of the power circuit 30 are connected together via cable sections (e.g. flexible insulated copper cable sections). The ends of cable sections are soldered and/or mechanically fastened to the respective electrical components to provide highly conductive electrical connections between the electrical components.

Figure 10:
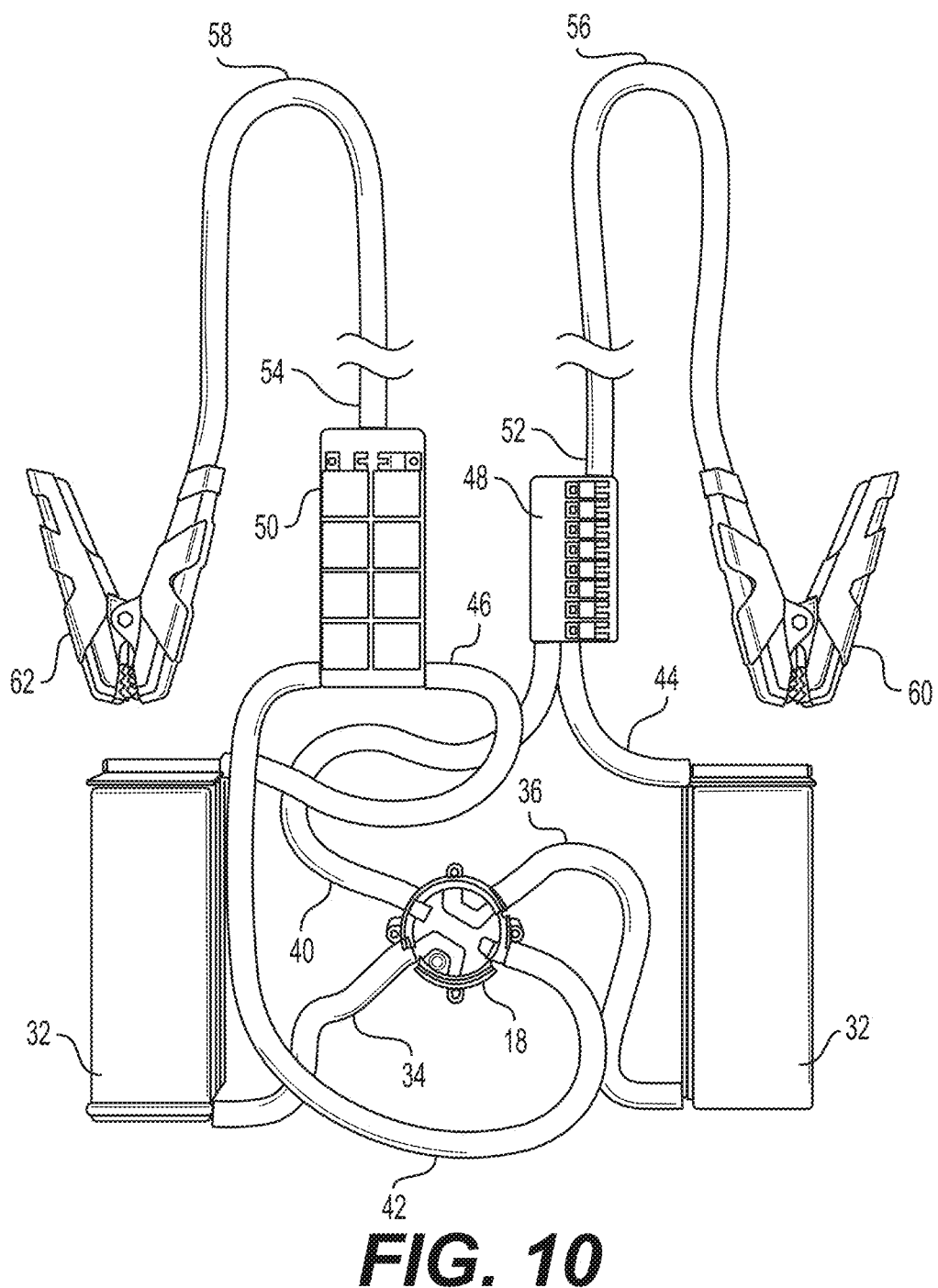
FIG. 10 is a top view of the layout of interior components of the battery jump starting device shown in FIG. 1 having non-detachable battery cables.

In a modified first embodiment shown in FIG. 10, the battery cables 56, 58 are directly hard wired to the reverse current diode array 48 and smart switch 50, respectively, eliminating the cam-locks 24a, 24b so that the battery cables 56, 58 are no longer detachable.

In a second embodiment of the power circuit to be described below, the cable sections 34, 36, 40, 42, 44, 46 (FIG. 9) are replaced with a highly conductive rigid frame.

The control switch 18 assembly is shown in FIGS. 12-15.

The control switch 18 comprises the following:
1) control knob 18a;
2) front housing 72 (Shown in FIG. 12 only);
3) rear housing 74;
4) rotor 76 having a collar 76a, legs 76b, and legs 76c;
5) springs 78;
6) pivoting contact 80 each having two (2) points of contact;
7) separate terminals 82, 84, 86, 88;
8) connected terminals 90, 92;
9) conductive bar 94
10) O-ring 96;
11) O-ring 98; and
12) O-ring 100.

The control knob 18a comprises a rear extension 18b, 18c configured (e.g. T-shaped cross section) to connect into a T-shaped recess 76e (FIG. 12) in rotor 76 when assembled. The rotor 76 is provided with a flange 76a configured to accommodate the portions of the rear extension 18b (e.g. round cross-section) therein.

The pair of legs 76c (e.g. U-shaped legs) of the rotor 76 partially accommodate the pair of springs 78, respectively, and the springs 78 apply force against the pivoting contacts 80 to maintain same is highly conductive contact with the selected contacts 82b-92c of the terminals 82-92.

The pivoting contacts 80 each have a pivoting contact plate 80a having a centered slot 80b configured to accommodate an end of each leg 76b of the rotor 76. When the rotor 76 is turned, each leg 76b actuates and pivots each pivoting contact plate 80a.

Further, the pivoting contact plates 80a each having a pair of spaced apart through holes 80c (e.g. oval-shaped through holes) serving as two (s) points of contact with selected contacts 82c-92c of the terminals 82-92.

The terminals 82-92 have threaded posts 82a-92a, spacer plates 82b-92b, and conductive bar 94, respectively, configured so that the contacts 82c-92c are all located in the same plane to allow selective pivoting movement of the pivoting contacts 80. The threaded posts 82a-92a of the terminals 82-92 are inserted through the through holes 74a, respectively, of the rear housing 74.

Figure 12:
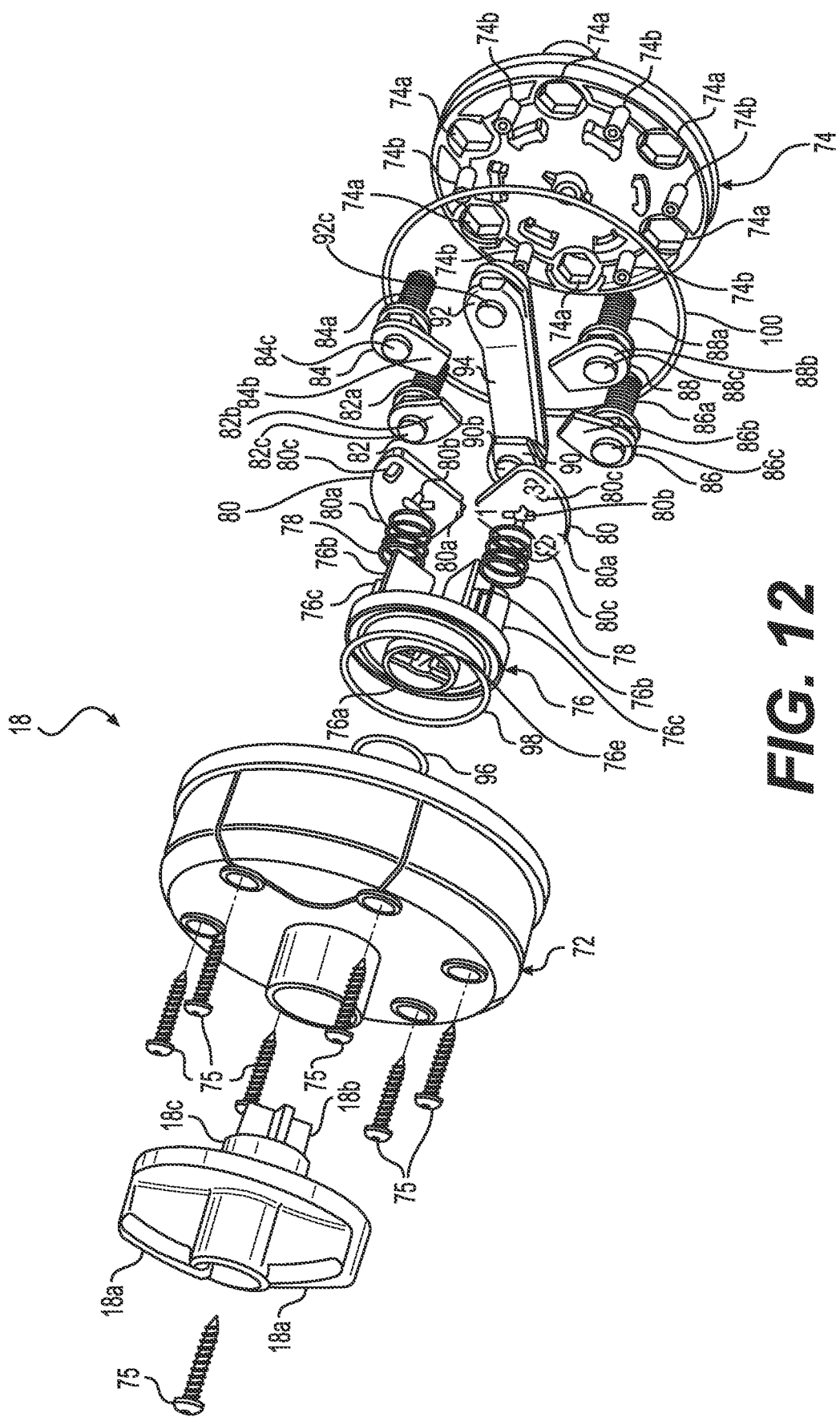
FIG. 12 is an exploded perspective view of the control switch installed on the front of the battery jump starting device shown in FIG. 1.

A set of O-rings (e.g. three (3) O-rings, as shown in FIG. 12, seal the separate the various components or parts of the control switch 18 as shown. After assembly of the control switch 18, a set of screws 75 connect with anchors 74b of the rear housing 74 to secure the front housing 72 to the rear housing 74 as shown in FIG. 12.

Figure 13:
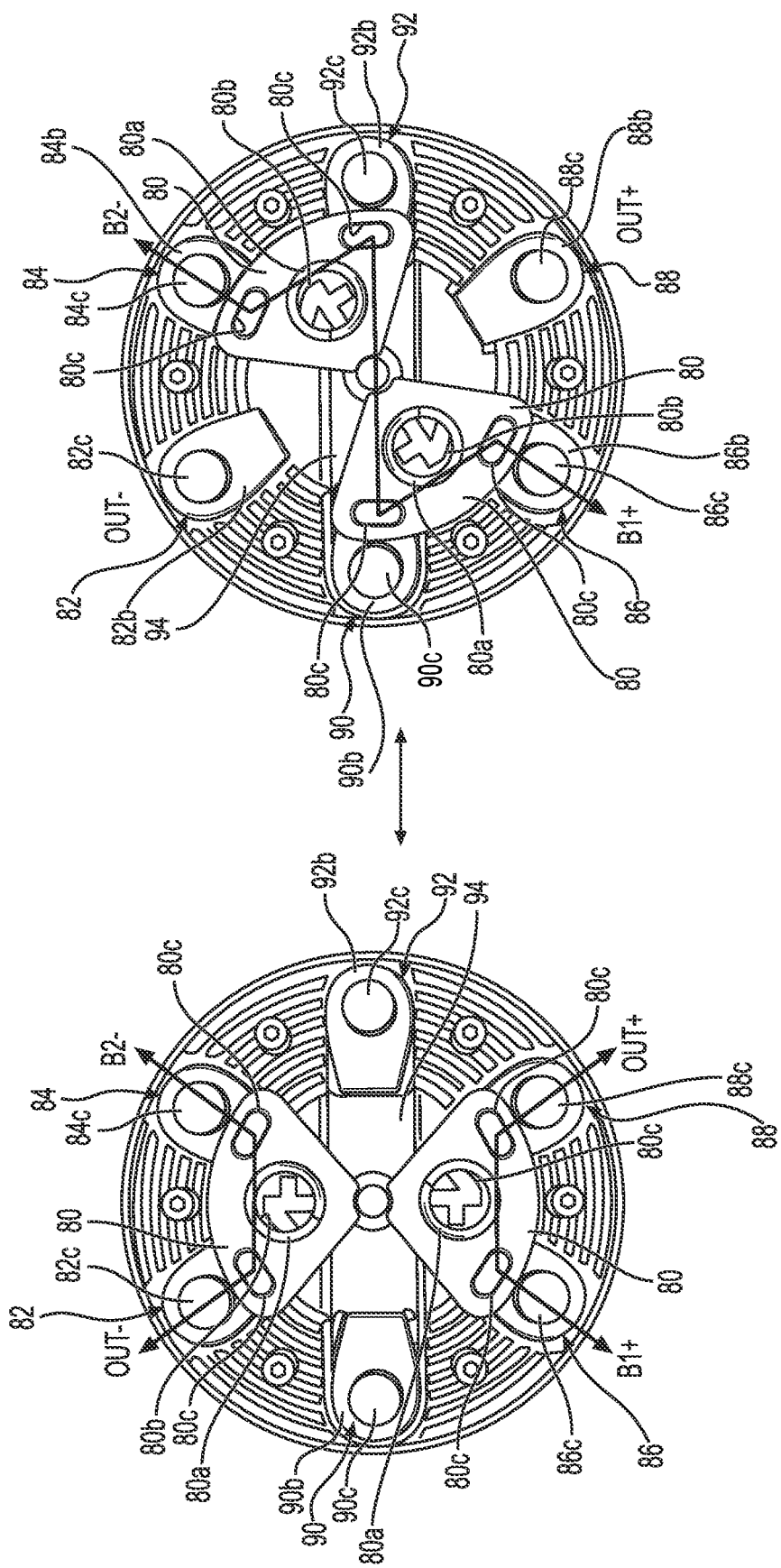
FIG. 13 is a front elevational view of the switch plate of the control switch shown in FIG. 12 operable between a first position and second position.

The control switch 18 is a 12V/24V selective type switch as shown in FIG. 13. The configuration of the pivoting contacts 80 in the first position or Position 1 (i.e. Parallel position) is shown on the left side of FIG. 13, and the second position or Position 2 (i.e. Series position) is shown on the right side of FIG. 13.

The rear side of the control switch 18 is shown in FIG. 14. Another highly conductive bar 94 is provided on the rear outer surface of the rear housing 74. The fully assembled control switch 18 is shown in FIG. 15.

A second embodiment of the battery jump starting device 110 has the internal electronic assembly shown in FIGS. 20-25. In the second embodiment, the outer cover is shown removed in FIGS. 16-25. The cover for the battery jump starting device 110 is the same as the cover 12 of the battery jump starting device 10 shown in FIG. 1-8.

In the second embodiment of the battery jump starting device 110 compared to the battery jump starting device 10 shown in FIGS. 1-8, the cable sections 34, 36, 40, 42, 44, 46 (FIG. 9) are replaced with a highly electrically conductive frame 170.

The battery jump starting device 110 comprises a pair of 12V Li-ion batteries 132 directly connected to the highly electrically conductive rigid frame 170. Specifically, the tabs of the Li-ion batteries are soldered to the highly electrically conductive rigid frame 170.

The highly electrically conductive rigid frame 170 is constructed of multiple highly electrically conductive rigid frame members 134, 136, 140, 142, 144, 146, 152, 154 connected together by mechanical fasteners (e.g. copper or aluminum nut and/or bolt fasteners) and/or soldering. For example, the highly electrically conductive rigid frame members are made of highly electrically conductive rigid copper rods. Alternatively, the highly electrically conductive rigid copper or aluminum rods can be replaced with highly electrically conductive rigid copper or aluminum plates, bars, rods, tubing, or other suitably configured highly electrically conductive copper or aluminum material (e.g. copper or aluminum stock material). The highly electrically conductive rigid frame members 134, 136, 140, 142, 144, 146 can be insulated (e.g. heat shrink) in at least key areas to prevent any internal short circuiting.

The highly electrically conductive rigid frame members can be configured with flattened end portions (e.g. flattened by pressing) each having a through hole to provide part of a mechanical connection for connecting successive or adjacent highly electrically conductive rigid frame members and/or electrical components together using a highly electrically conductive nut and bolt fastener (e.g. copper bolt and nut). Alternatively, a highly electrically conductive rigid frame member can be formed into a base (e.g. plate or bar portion) for an electrical component.

For example, the reverse flow diode assembly 148 has three (3) base portions, including 1) an upper highly electrically conductive rigid bar 148a (FIG. 16) having a flattened end portion 148aa connected to the flattened end portion 144a of highly electrically conductive rigid frame member 144 using a highly electrically conductive fastener 206 (e.g. made of copper or aluminum) having a highly electrically conductive bolt 206a and highly electrically conductive nut 206b; 2) a lower highly electrically conductive rigid bar 148b made from a flattened end portion of highly electrically conductive rigid frame member 144; and 3) a center highly electrically conductive rigid bar 148c made from a flattened end portion of highly electrically conductive rigid frame member 152.

As another example, the smart switch 150 (FIG. 16) comprises a highly electrically conductive rigid plate 150a serving as a base supporting the solenoid 150b. The highly electrically conductive rigid plate 150a is provided with through holes for connecting highly electrically conductive rigid frame members to the smart switch 150 (e.g. highly electrically conductive rigid frame member 142) using the highly electrically conductive fastener The stock material (e.g. copper or aluminum plate, bar, rod, and/or tubing) selected for construction of the highly electrically conductive rigid frame 170 has substantial gauge to provide highly electrical conductivity and substantial rigidity. The "rigid" nature of the highly electrically conductive rigid frame 170 provides the advantage that the highly electrically conductive rigid frame remains structurally stiff and stable during storage and use of the battery jump starting device 110.

For example, the highly electrically conductive rigid frame 170 is designed and constructed to sufficiently prevent flexing, movement, bending and/or displacement during storage or use so as to prevent electrical shortages of the highly electrically conductive rigid frame touching other internal electrical components or parts of the electronic assembly. This "rigid" nature is important due to the high electrically conductivity path or pathway of electrical power from the Li-ion batteries flowing through the power circuit and reaching the battery clamps. It is a desired goal and feature of the present invention to conduct as much power as possible from the Li-ion batteries to the battery being jump started by the battery jump starting device by reducing or minimizing any electrical resistance by using the heavy duty and highly electrically conductive rigid frame 170 arrangement disclosed.

As an alternative, the highly electrically conductive rigid frame can be constructed as a single piece having no mechanically fastened joints. For example, the highly electrically conductive rigid frame can be made from a single piece of stock material and then formed into the highly electrically conductive rigid frame. For example, a billet of highly electrically conductive copper or aluminum can be machined (e.g. milled, lathed, drilled) into the highly electrically conductive rigid frame. As another example, a copper or aluminum sheet or plate can be bent and/or machined into the highly electrically conductive rigid frame. As a further alternative, the highly electrically conductive rigid frame can be metal molded (e.g. loss wax process).

As another alternative, the highly electrically conductive rigid frame is made of multiple highly electrically conductive rigid frame members connected together into a unitary structure. For example, the highly electrically conductive rigid frame is made of highly electrically conductive sections of stock material (e.g. copper rod, plate, bar, tubing), which are bent and soldered and/or welded together.

Figure 17:
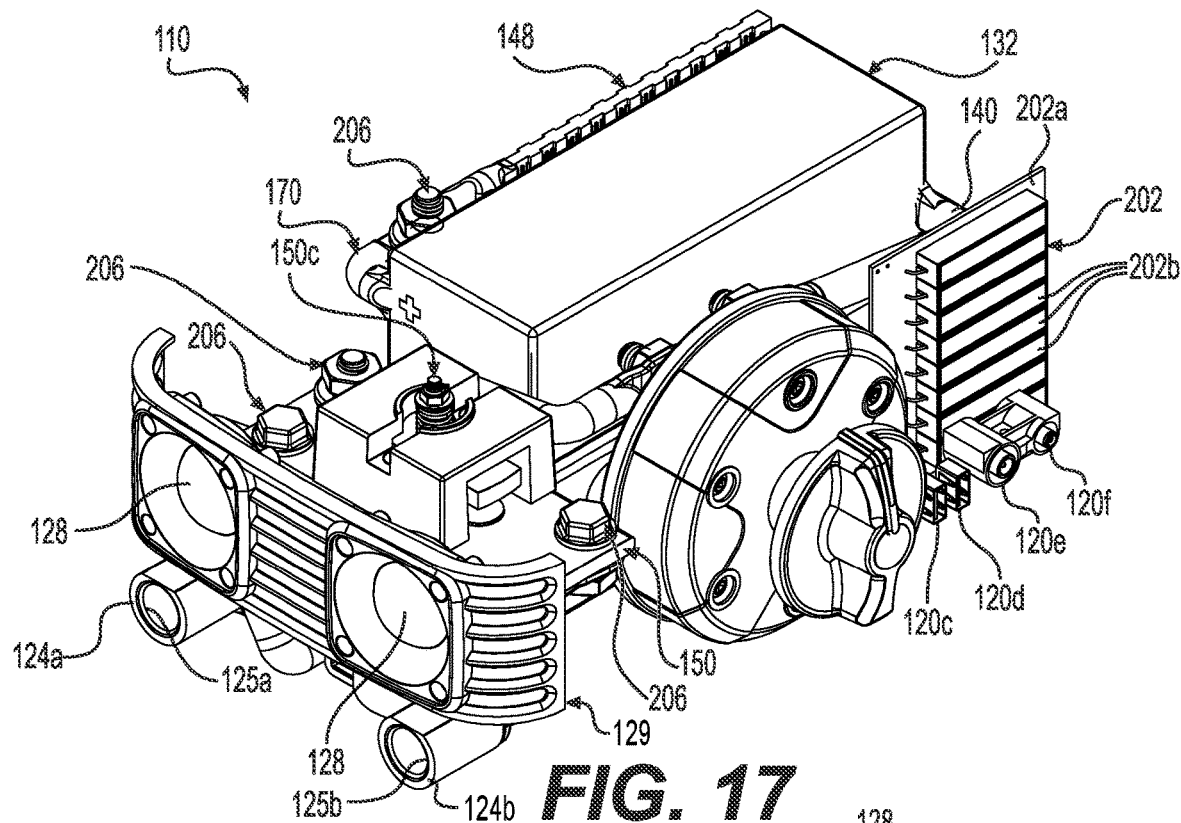
FIG. 17 is a front and left side perspective view of the battery jump starting device shown in FIG. 1 with the cover removed.
Figure 18:
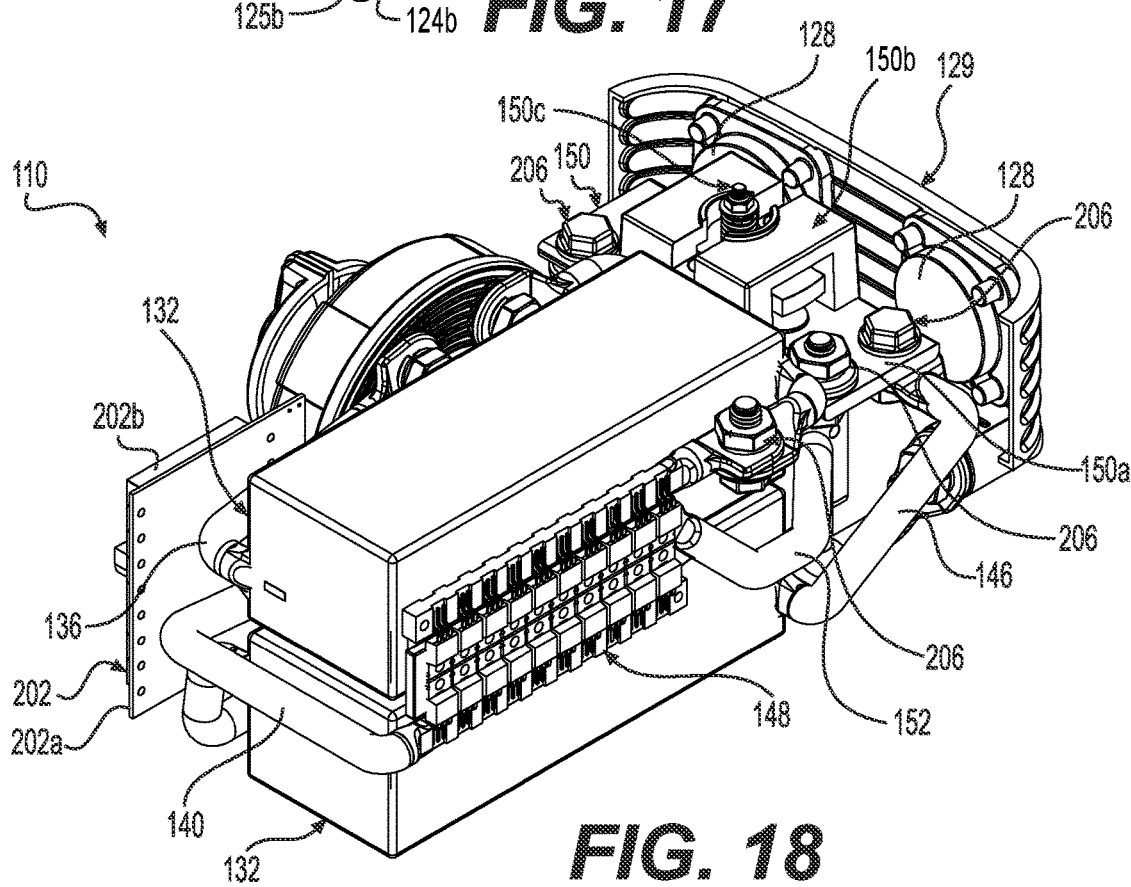
FIG. 18 is a rear and right side perspective view of the battery jump starting device shown in FIG. 1 with the cover removed.
Figure 19:
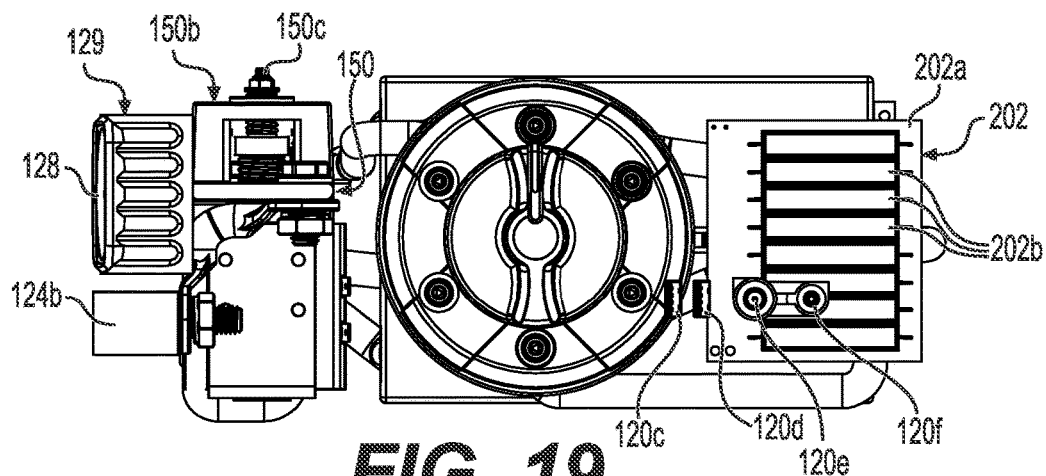
FIG. 19 is a front elevational view of the battery jump starting device shown in FIG. 1 with the cover removed.
Figure 20:
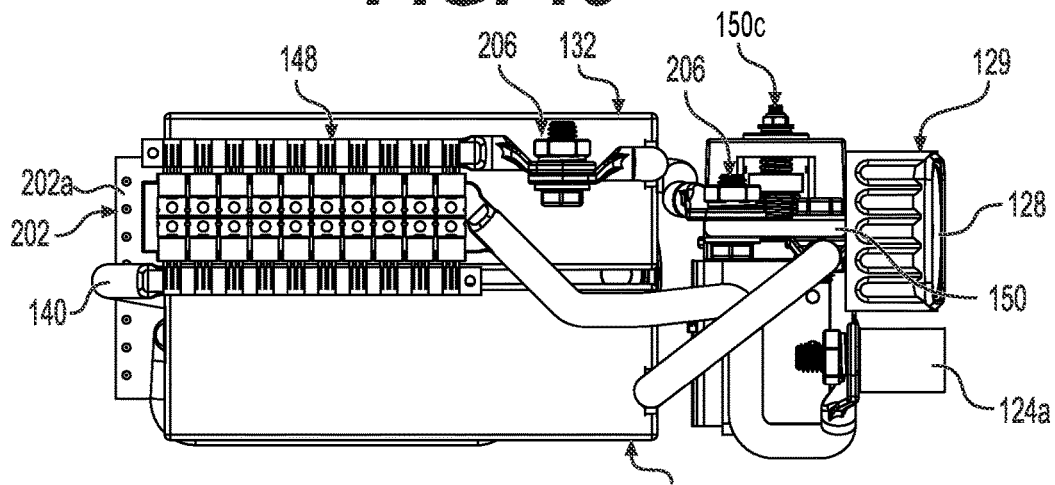
FIG. 20 is a rear elevational view of the battery jump starting device shown in FIG. 1 with the cover removed.
Figure 21:
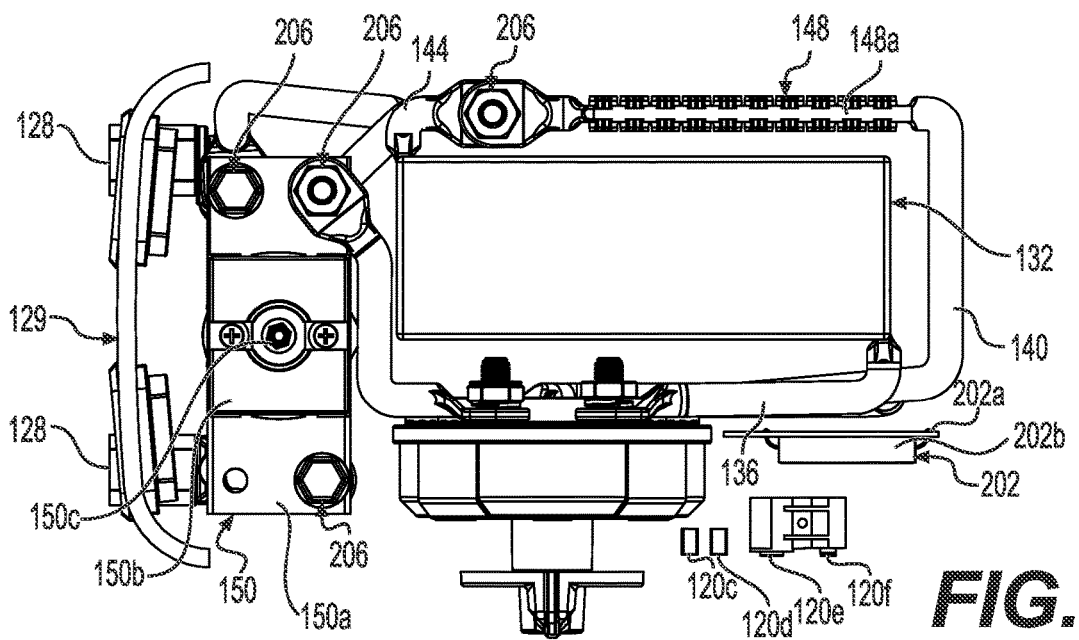
FIG. 21 is a top planar view of the battery jump starting device shown in FIG. 1 with the cover removed.
Figure 22:
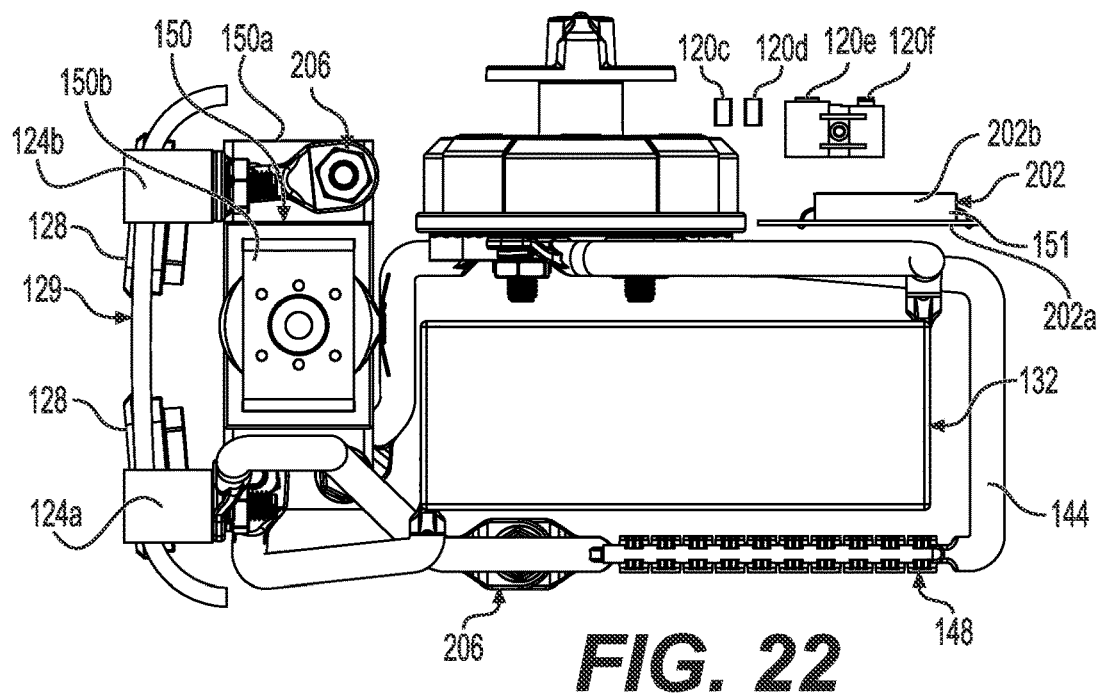
FIG. 22 is a bottom planar view of the battery jump starting device shown in FIG. 1 with the cover removed.
Figure 23:
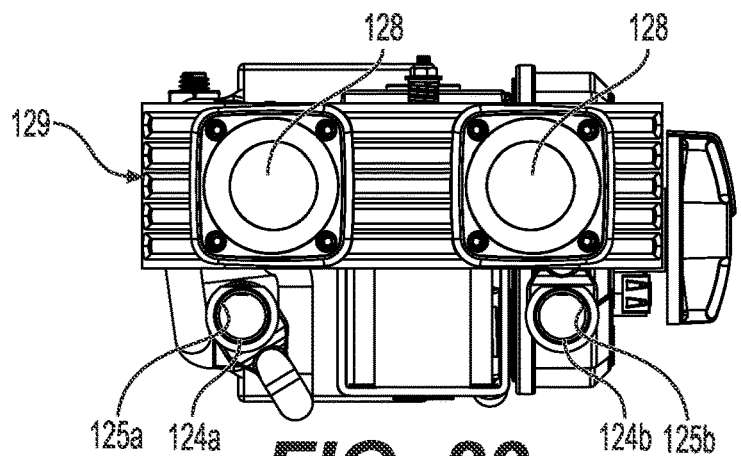
FIG. 23 is a left side elevational view of the battery jump starting device shown in FIG. 1 with the cover removed.
Figure 24:
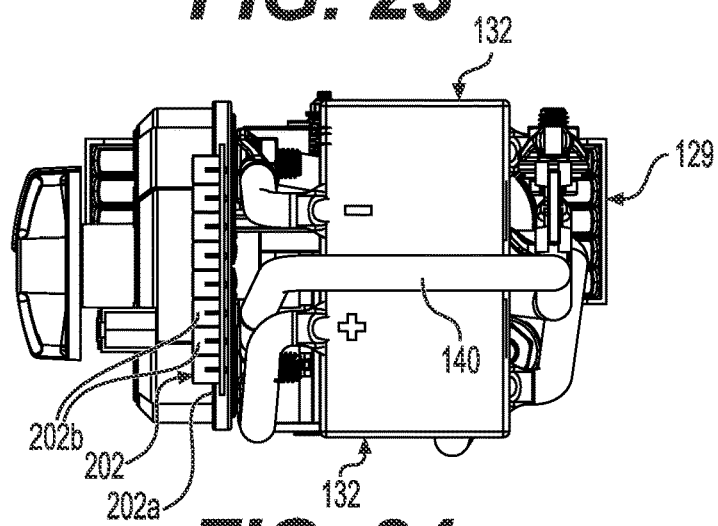
FIG. 24 is a right side elevational view of the battery jump starting device shown in FIG. 1 with the cover removed.

The battery jump starting device 110 further comprises a resistor array 202 (e.g. 12 V 5A XGC) comprising a printed circuit board (PCB) 202a serving as a base supporting an array of individual resistors 202b, as shown in FIGS. 17 and 19. The PCB 202a also supports the dual 2.1 amp (A) USB OUT ports 120c, 120d, the 18A 12V XGC OUT port 120e, and the 5A 12V XGC IN port 120f.

Figure 16:
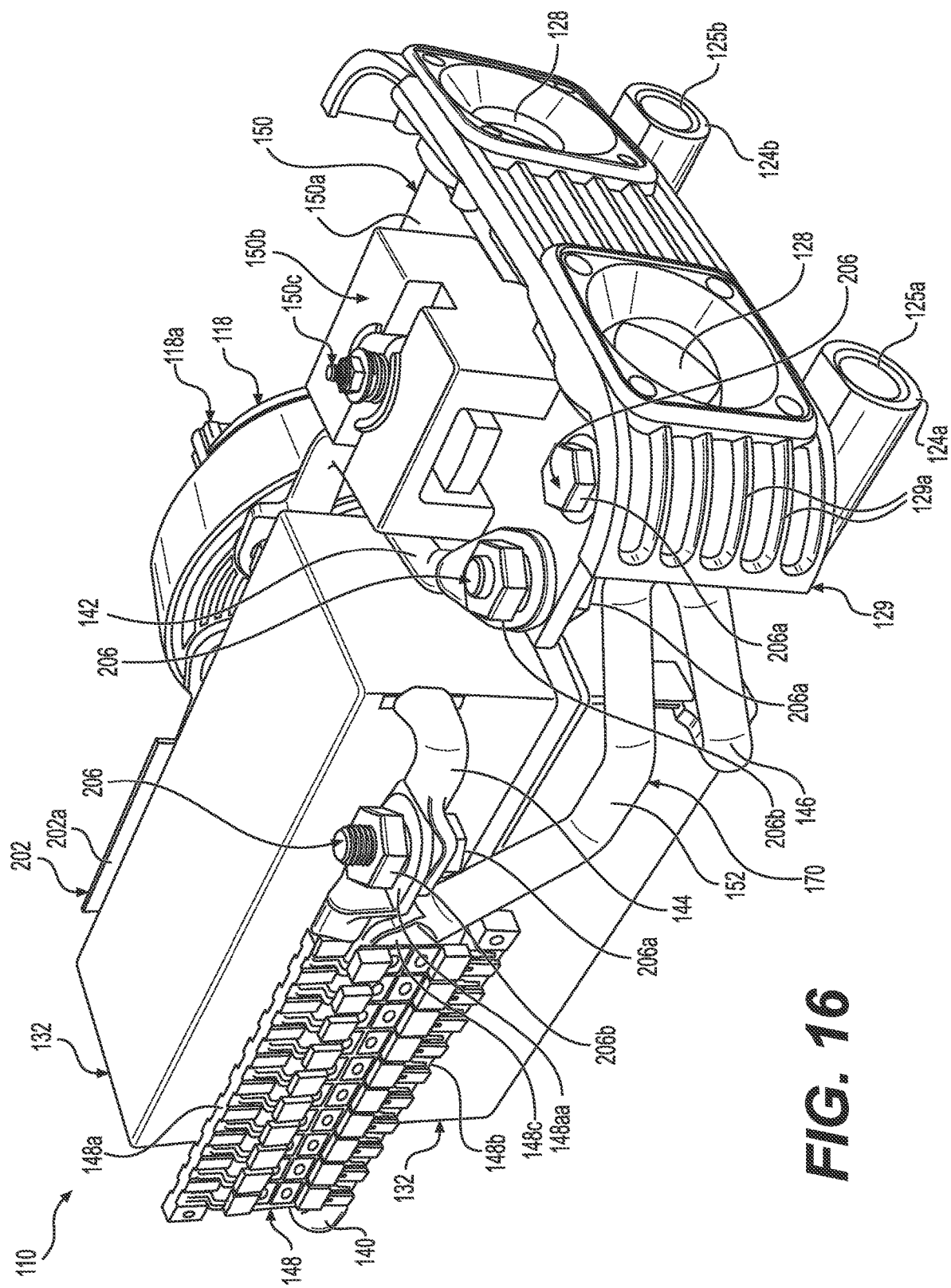
FIG. 16 is a rear and left side perspective view of the battery jump starting device shown in FIG. 1 with the cover removed.

The left side of the battery jump starting device 110 is also fitted with a pair of light emitting diodes 128 (LEDS) for using the battery jump starting device 110 as a work light. For example, the LEDs 128 are dual 1100 Lumen high-intensity LED floodlights), as shown in FIG. 16. The LEDs 128 are configured to have seven (7) operational modes, including 100% intensity, 50% intensity, 10% intensity, SOS (emergency protocol), Blink, Strobe, and Off.

The battery jump starting device 110 is fitted with a heat sink 129 (FIG. 16) for dissipating heat from the LEDs 128. For example, the heat sink 129 is made of a heat conductive material (e.g. molded metal plate). The heat sink 129 is provided with ribs 129a transferring heat to the surrounding atmosphere to prevent the LEDs 128 from overheating.

The battery jump starting device 110 is shown in FIG. 16 without any battery cables having clamps for connecting the battery jump starting device 110 to a battery of a vehicle to be jump started. The battery jump starting device can be configured to detachably connect to a set of battery cables having battery clamps (e.g. positive battery cable with a positive clamp, negative battery cable with a negative clamp). Alternatively, the battery jump starting device can be fitted with battery cables having clamps hard wired to the device and non-detachable.

For example, the left side of the battery jump starting device 110 is provided with a POSITIVE (+) cam-lock 124*a* and a NEGATIVE (−) cam-lock 124*b*, as shown in FIG. 16. The cam-locks 124*a*, 124*b* include receptacles 125*a*, 125*b* configured for detachably connecting with connecting end 56*a* (FIG. 11) of the positive battery cable 56 and the connecting end 58*a* of negative battery cable 58, respectively. The cam-locks 124*a*, 124*b* can be fitted with sealing caps for closing and sealing the receptacles 125*a*, 125*b* of the cam-locks 124*a*, 124*b*, respectively, during non-use of the battery jump starting device 110.

Figure 25:
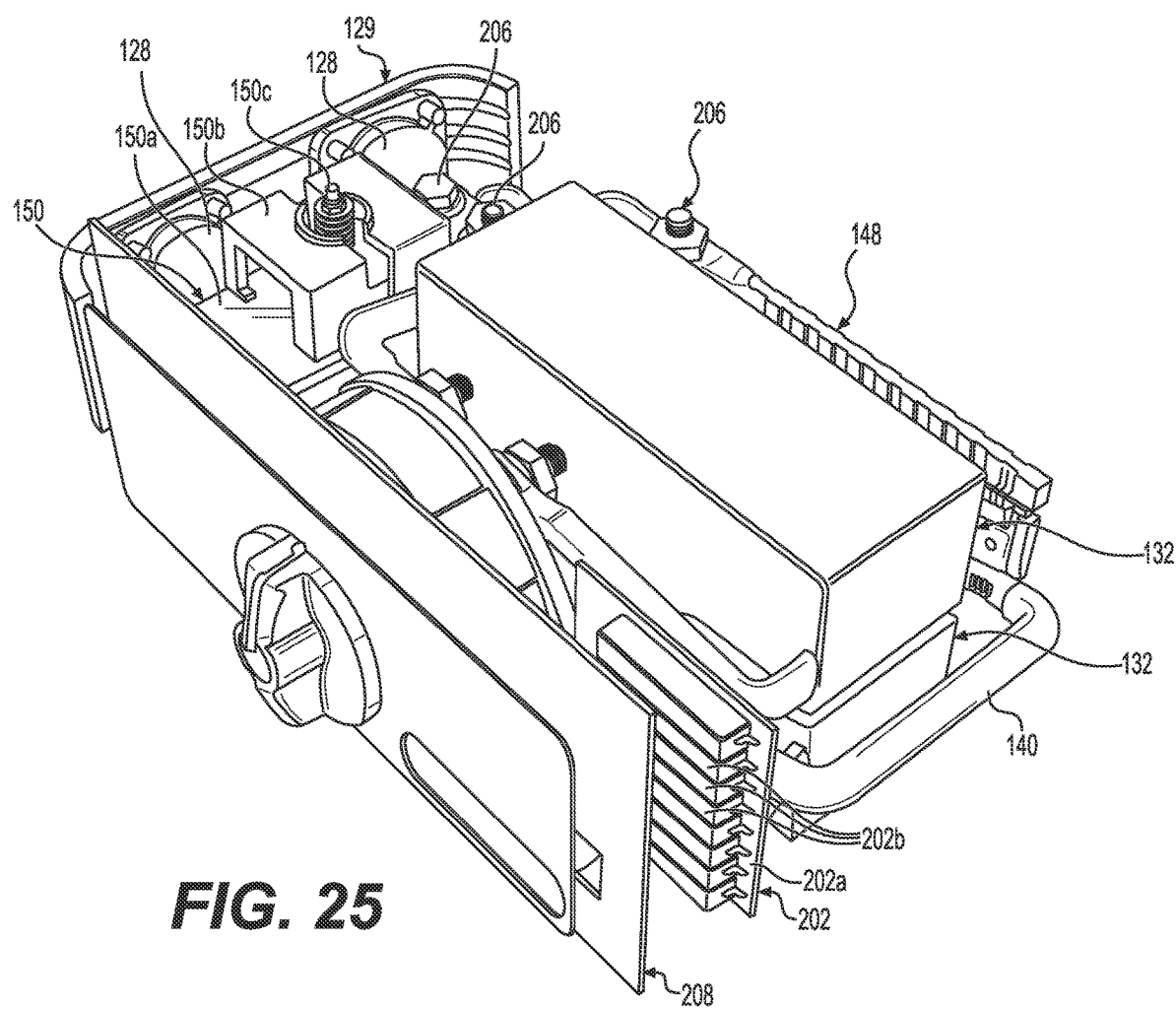
FIG. 25 is a front and top perspective view of the battery jump starting device shown in FIG. 1 with the cover removed.
Figure 26:
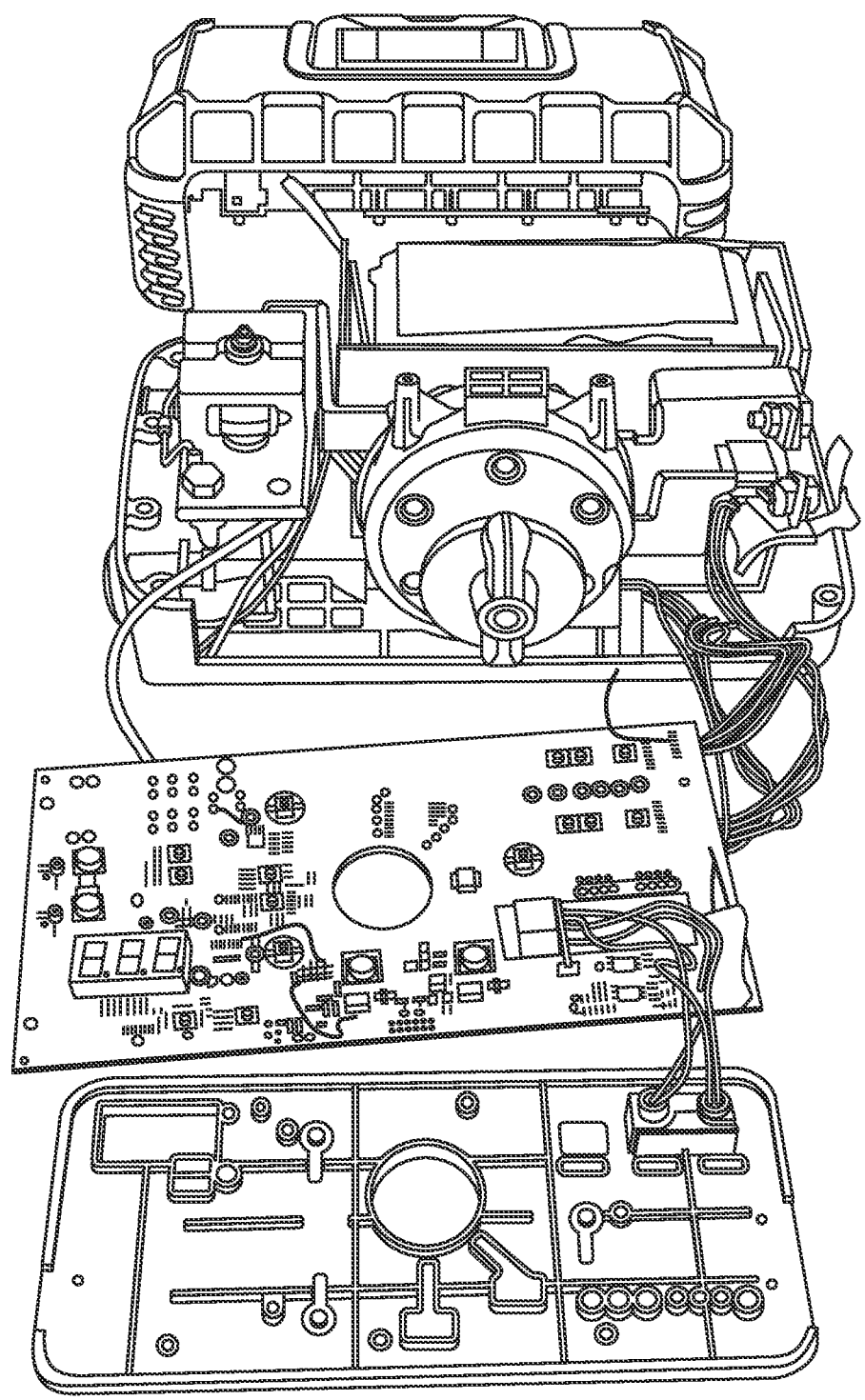
FIG. 26 is a front perspective view of the disassembled battery jump starting device shown in FIG. 1.
Figure 27:
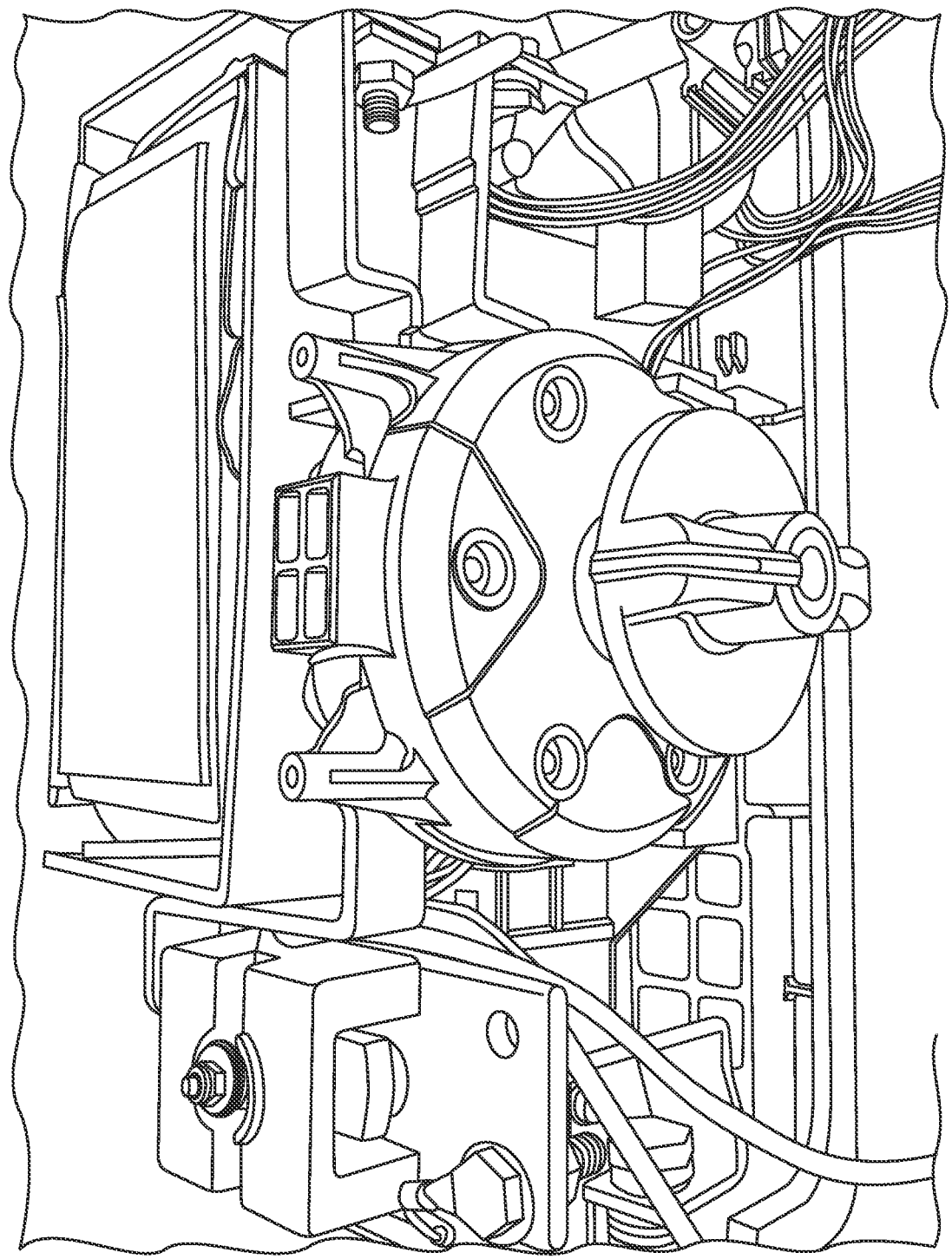
FIG. 27 is a partial front perspective view of the disassembled battery jump starting device shown in FIG. 1.
Figure 28:
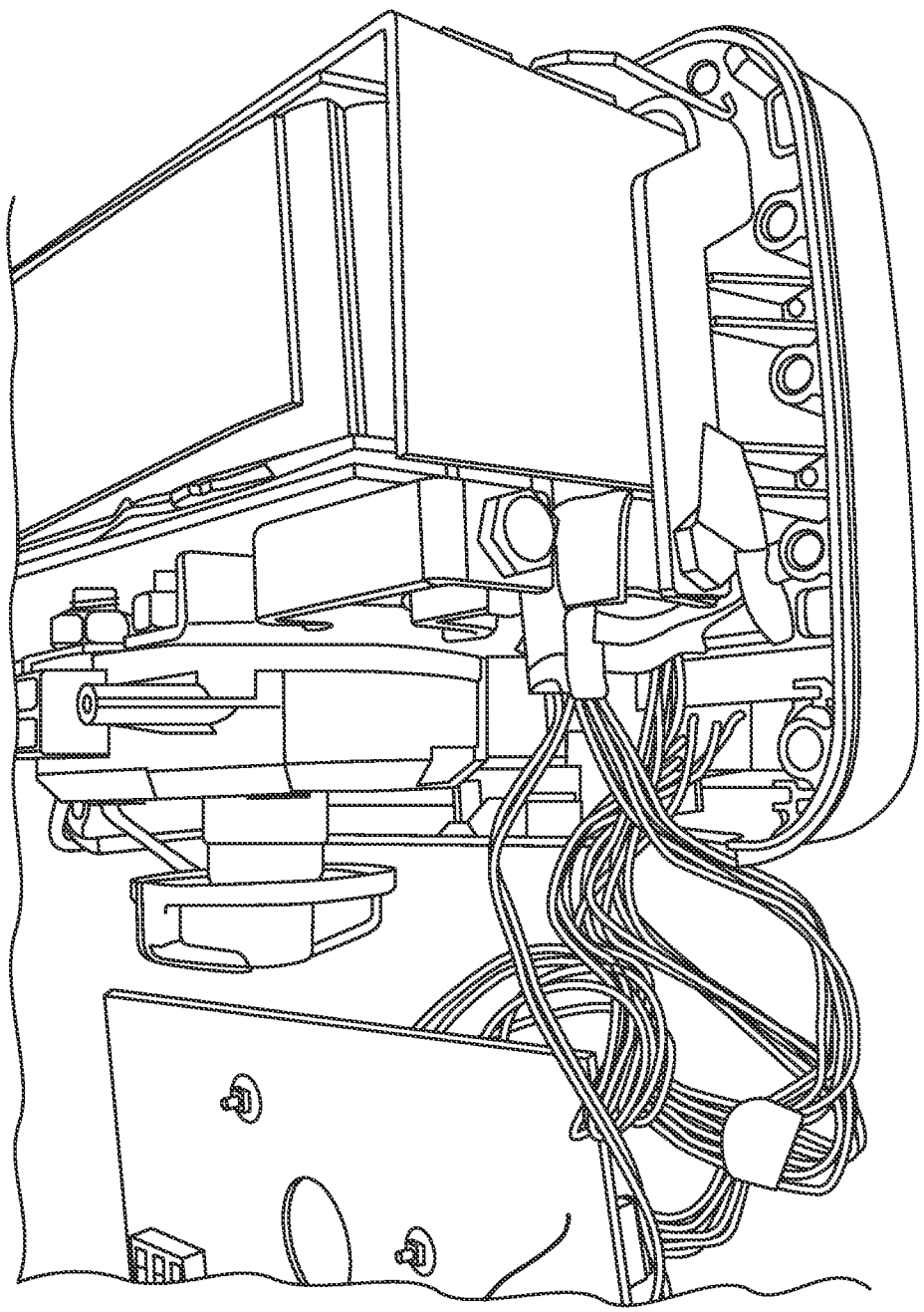
FIG. 28 is a partial right side perspective view of the disassembled battery jump starting device shown in FIG. 1.
Figure 29:
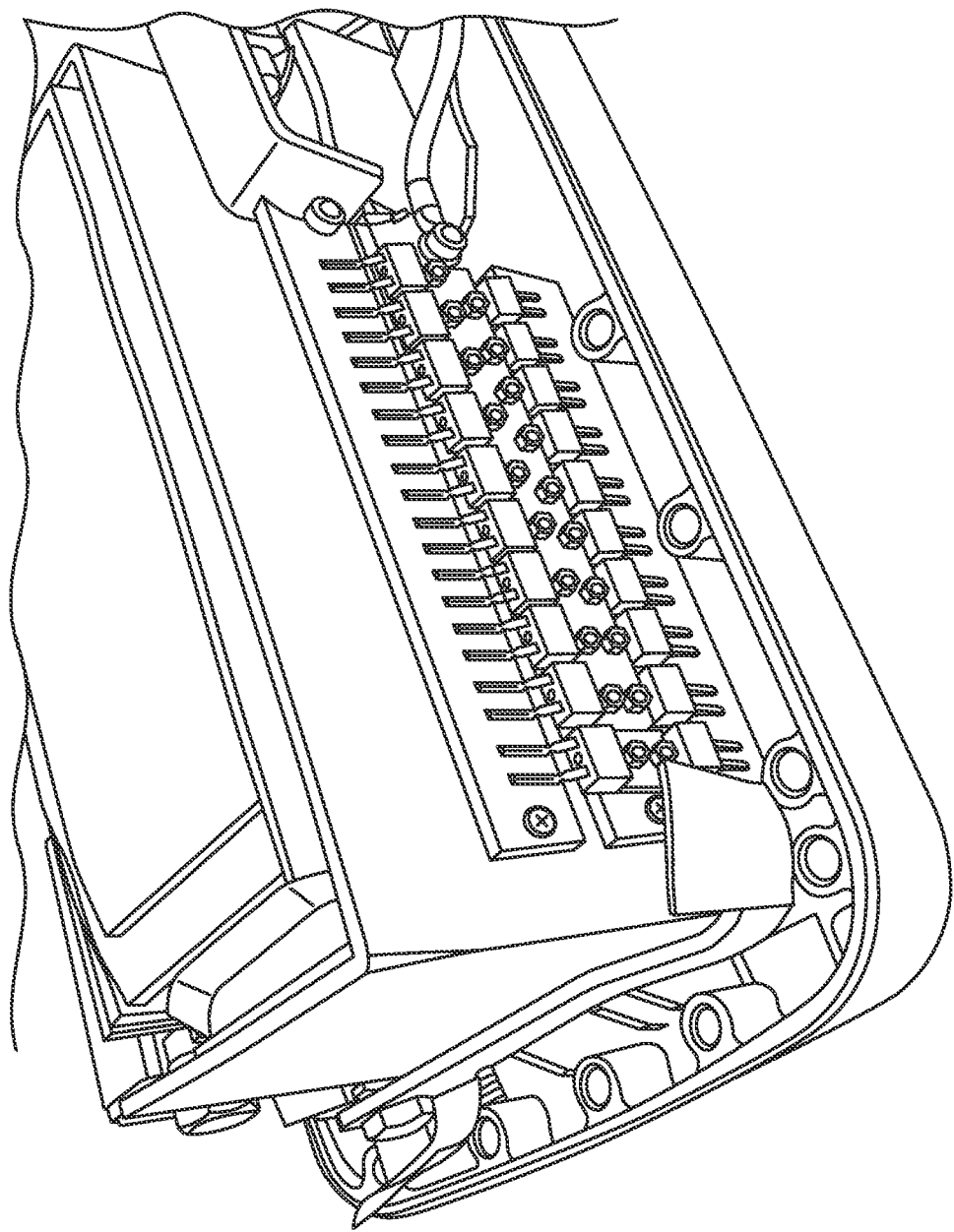
FIG. 29 is a partial rear and right side perspective view of the disassembled battery jump starting device shown in FIG. 1.
Figure 30:
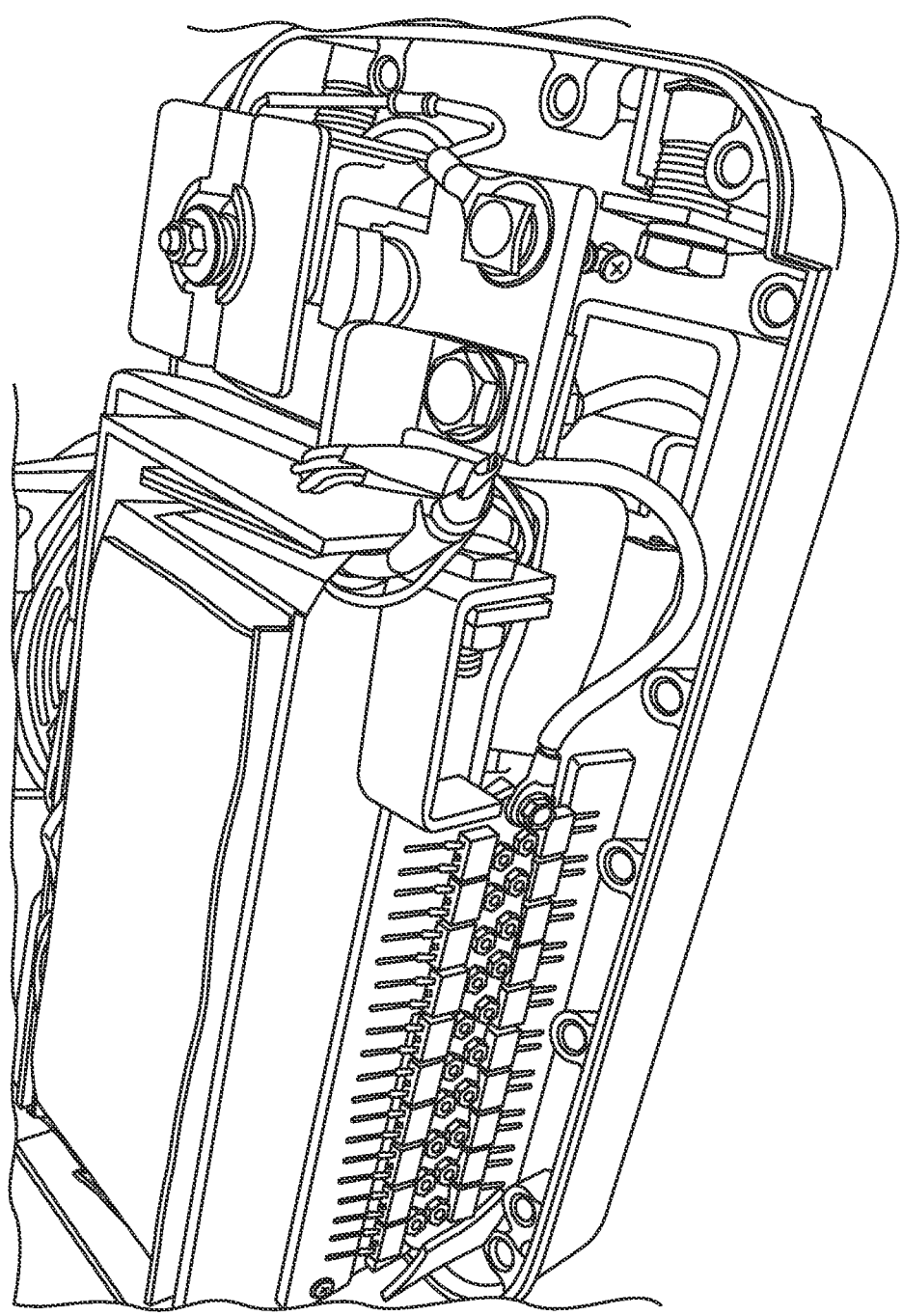
FIG. 30 is a partial rear perspective view of the disassembled battery jump starting device shown in FIG. 1.
Figure 31:
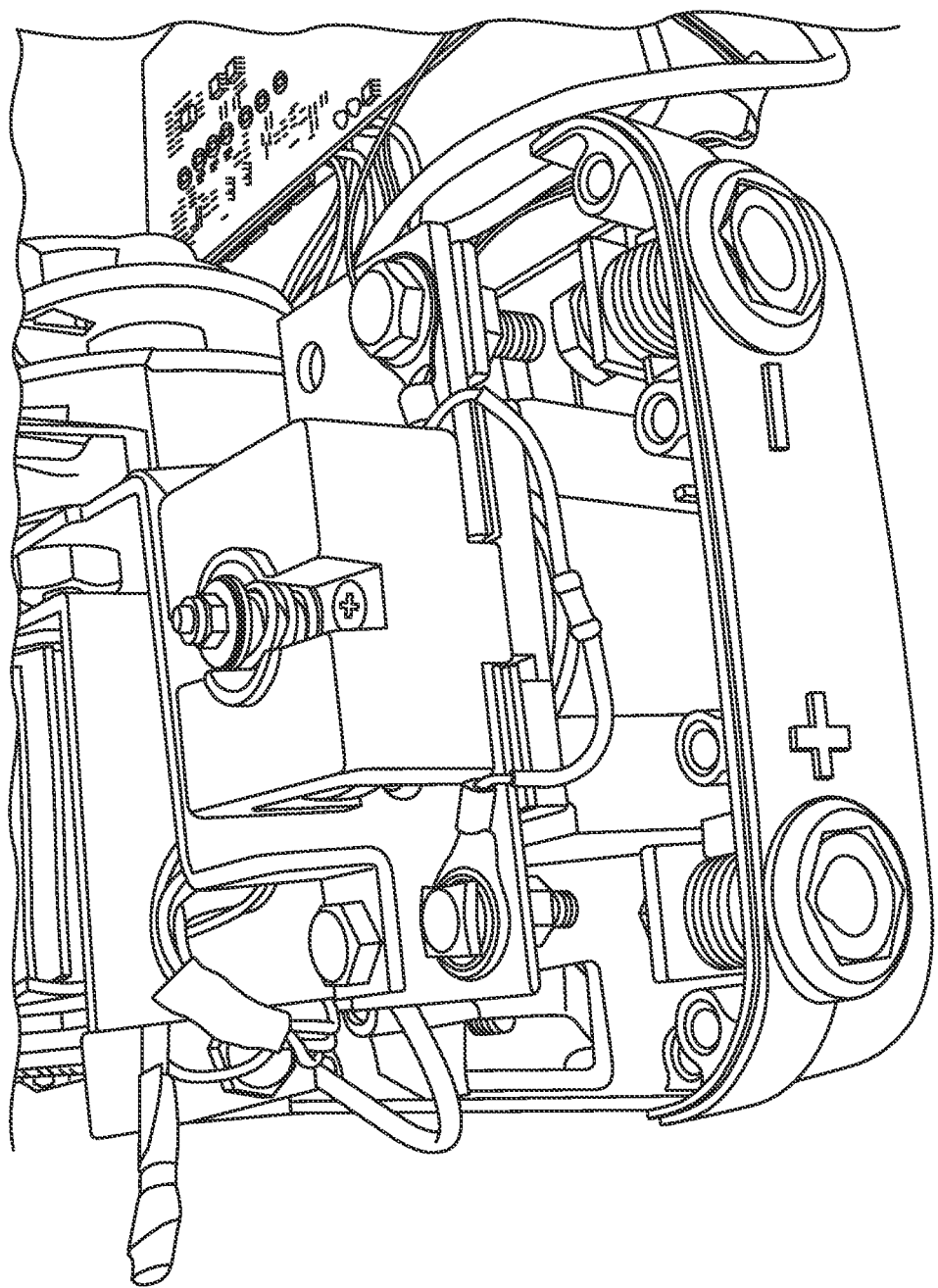
FIG. 31 is a partial right side perspective view of the disassembled battery jump starting device shown in FIG. 1.

The battery jump starting device 110 comprises a printed circuit board 208 located behind the interface, as shown in FIG. 25. The interior assembly the battery jump starting device is shown in FIGS. 26-31.

The positive cam-locks 24*a*, 124*a* and negative cam-locks 24*b*, 124*b* are shown in FIGS. 1 and 16. These cam-locks can be the same or similar to the construction of the cam-lock 27 shown in FIGS. 32-45, and described in detail below.

The positive cam-locks 24*a*, 124*a* can have the same construction as the negative cam-locks 24*b*, 124*b*. The cam-locks 24*a*, 24*b* detachably connect the battery cables 56, 58 (FIG. 9) to the power circuit 30 of the battery jump starting device 10. The cam-locks 124*a*, 124*b* are mechanically anchored to the base plate (FIG. 16) of the base plate 150*a* of the smart switch 150. The construction of the cam-locks 24*a*, 124*a*, 24*b*, 124*b* will be described using cam-lock 27 as an example.

The cam-locks 24*a*, 24*b*, 124*a*, 124*b* can be used for other applications for detachably connecting a conductive electrical cable to an electronic device.

Figure 32:
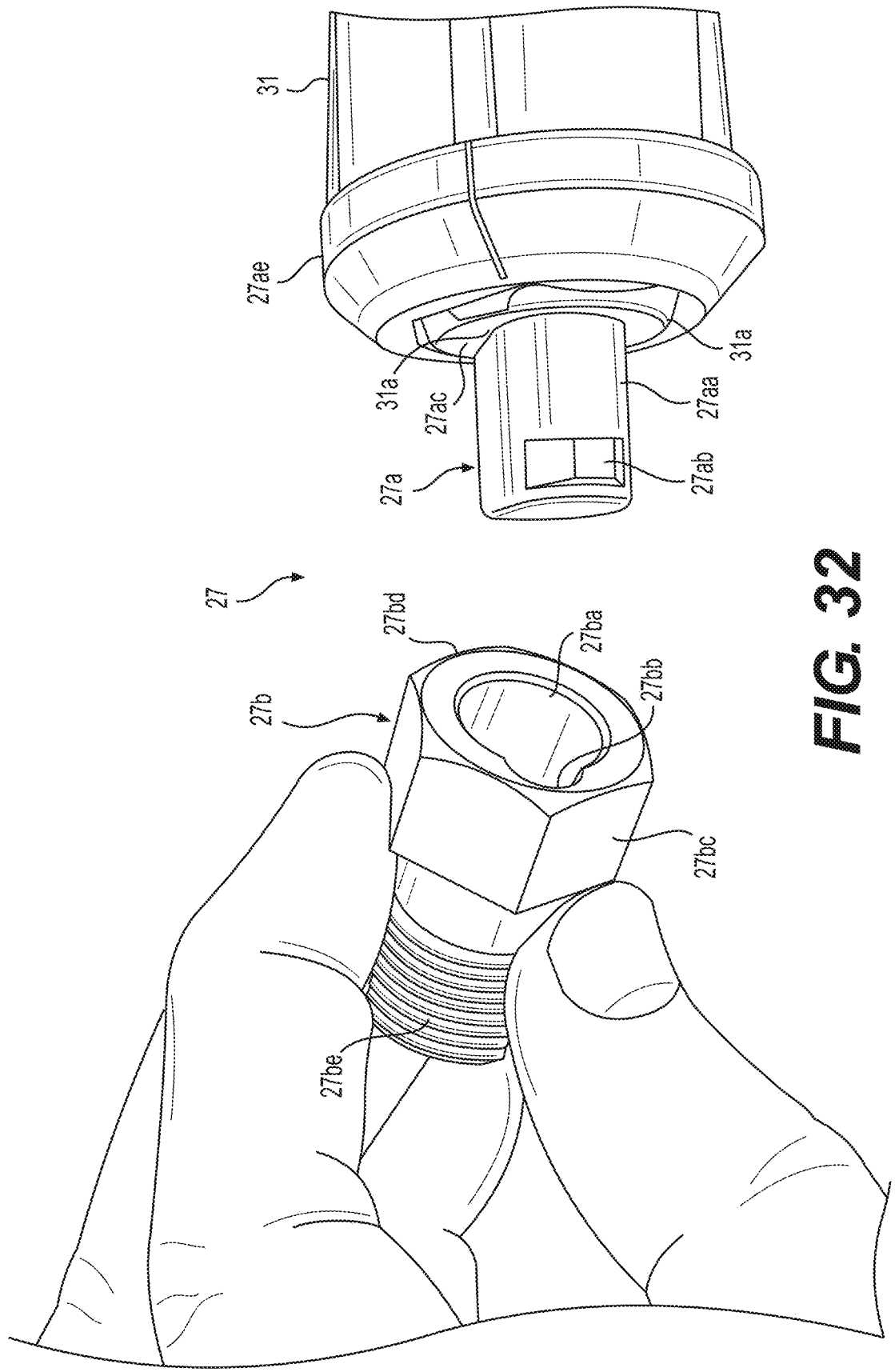
FIG. 32 is a perspective view of the cam-lock connecting device according to the present invention for use, for example, with the battery jump starting device according to the present invention shown with the male cam-lock end disconnected from the female cam-lock end.
Figure 33:
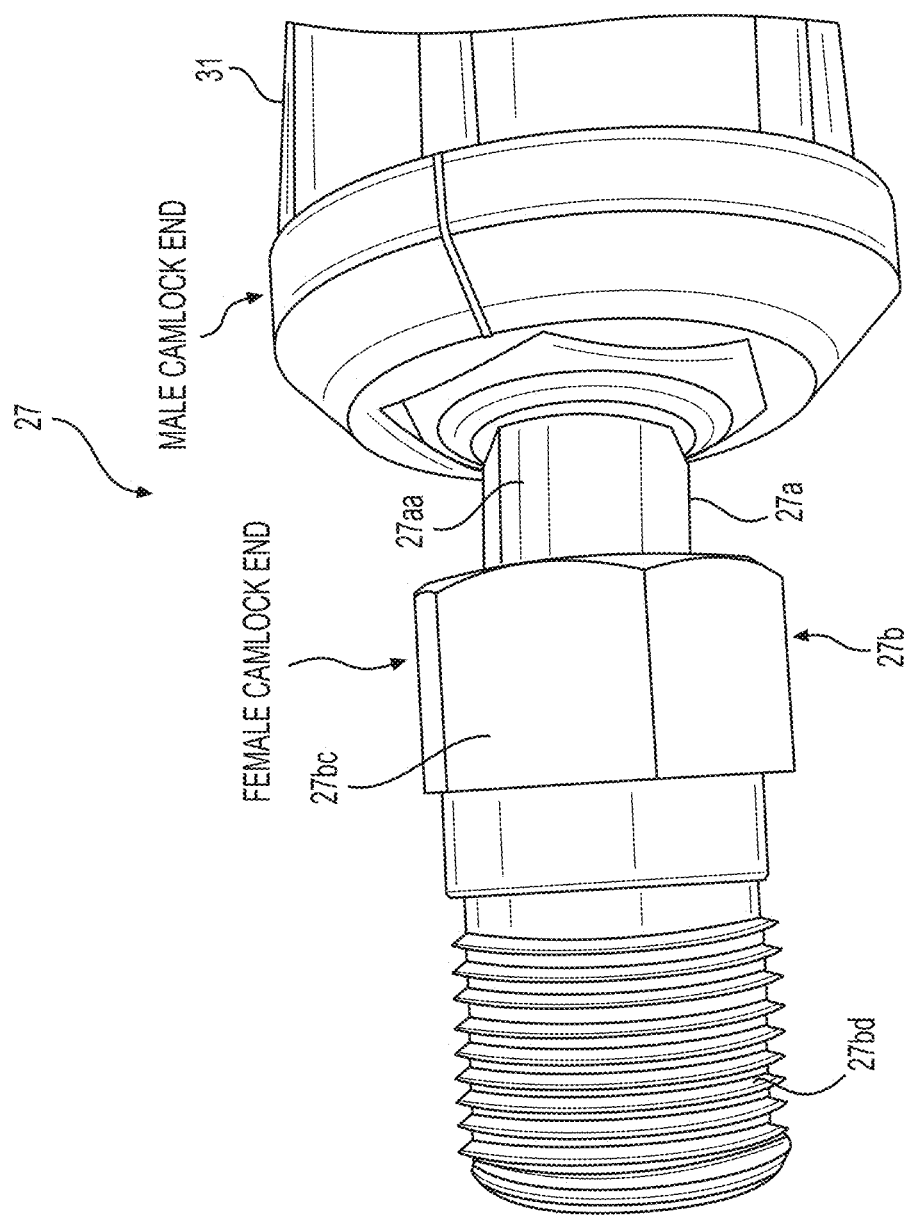
FIG. 33 is a perspective view of the cam-lock connecting device shown in FIG. 26 with the male cam-lock end partially connected to the female cam-lock end.
Figure 34:
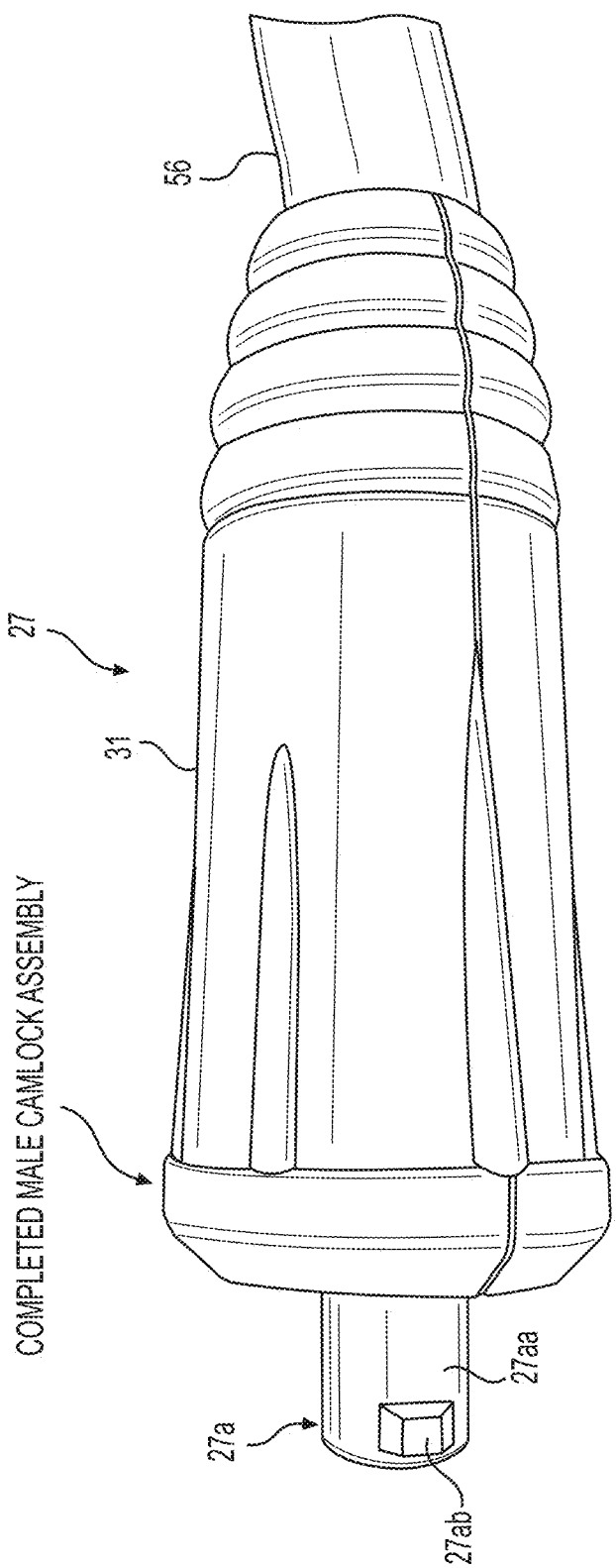
FIG. 34 is a perspective view of the male cam-lock end of the cam-lock connecting device shown in FIG. 32.

The details of the construction of the cam-lock 27 is shown in FIG. 32. Again, the construction for the cam-locks 24*a*, 124*a*, 24*b*, 124*b* can be the same as or similar to cam-lock 27 (FIG. 32).

The cam-lock 27 comprises a male cam-lock end 27*a* and a female cam-lock end 27*b* for detachable connecting the battery cables 56, 58 (FIG. 10), respectively, to the battery jump starting device 10, 110.

The male cam-lock end 27*a* comprises a pin 27*aa* having a tooth 27*ab*. The female cam-lock end 27*b* comprises a receptacle 27*ba* having a slot 27*bb* together located in a hex portion 27*bc*. The receptacle 27*ba* is configured to accommodate the pin 27*aa* and tooth 27*ab* of the male cam-lock end 27*a*. Specifically, the pin 27*aa* and tooth 27*ab* of the male cam-lock end 27*a* can be inserted (FIG. 32) into the receptacle 27*ba* and slot 27*bb* a fixed distance until the tooth 27*ab* contacts an interior surface of the internal thread of the female cam-lock 27*b* to be described below. The male cam-lock end 27*a* can be rotated (e.g. clockwise) to tighten within the female cam-lock end 27*b* until the end face portion 27*ac* of the male cam-lock end 27*a* engages with the end face portion 27*bd* of the female cam-lock end 27*b*. The more the cam-lock 27 is tightened, the better the electrical connection is between the male cam-lock end 27*a* and the female cam-lock end 27*b*.

The male cam-lock end 27*a* is fitted with a rubber molded cover 31, as shown in FIG. 32, to insulate and improve the grip on the male cam-lock end 27*a*. The highly electrically conductive cable 56 is electrically and mechanically connected to the male cam-lock end 27*a*, and is fitted through a passageway in the rubber molded cover 31.

Figure 35:
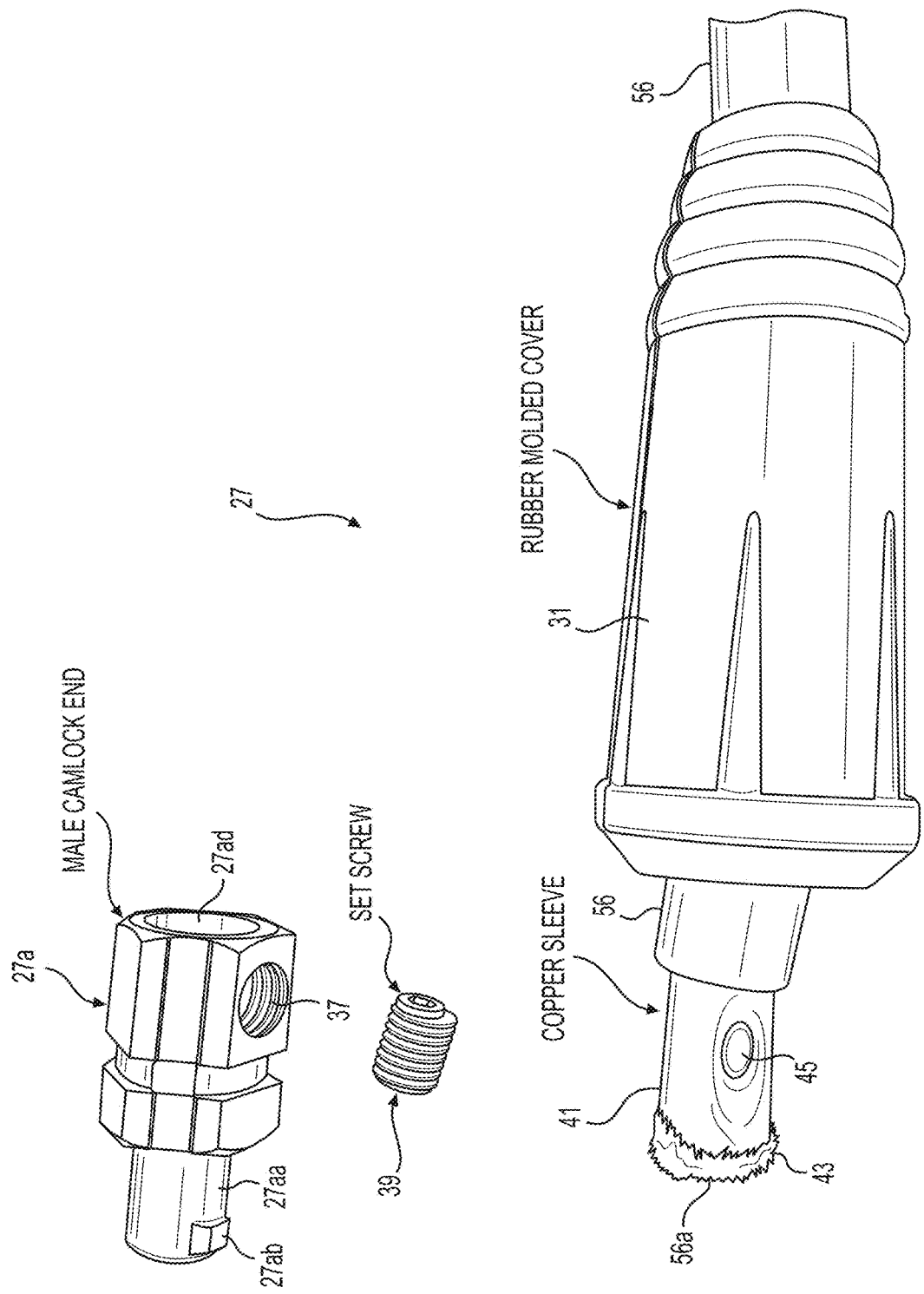
FIG. 35 is a disassembled perspective view of the male cam-lock end of the cam-lock connecting device shown in FIG. 32.

The assembly of the male cam-lock 27*a* is shown in FIG. 35. The male cam-lock 27*a* is provided with a thread hole 37 for accommodating Allen head fastener 39. The one end of the male cam-lock 27*a* is provided with a receptacle 27*ad* for accommodating the copper or aluminum sleeve 41 fitted onto the end of the inner conductor 56*a* of the battery cable 56. The copper or aluminum sleeve 41 is soldered onto the inner conductor 56*a* using solder 43.

Figure 36:
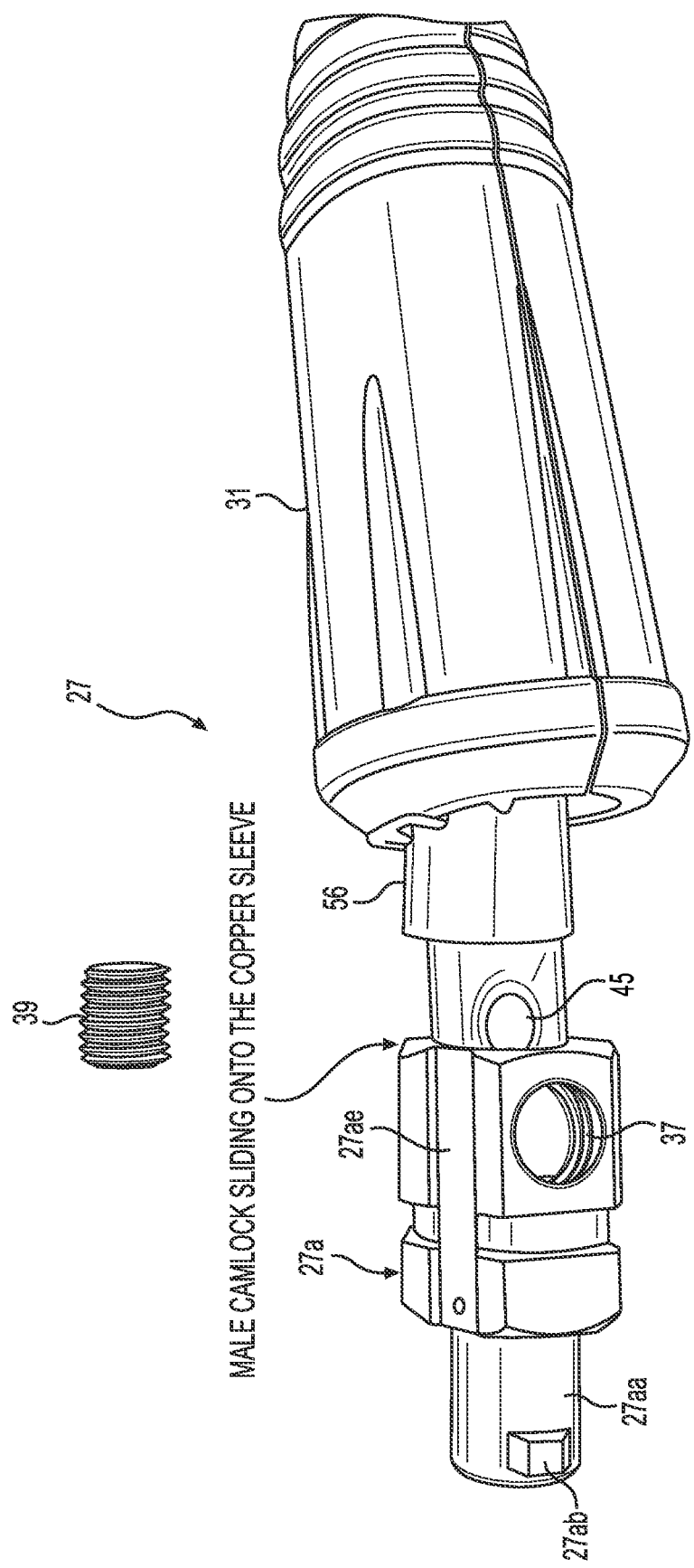
FIG. 36 is a partially assembled perspective view of the male cam-lock end of the cam-lock connecting device shown in FIG. 32.
Figure 39:
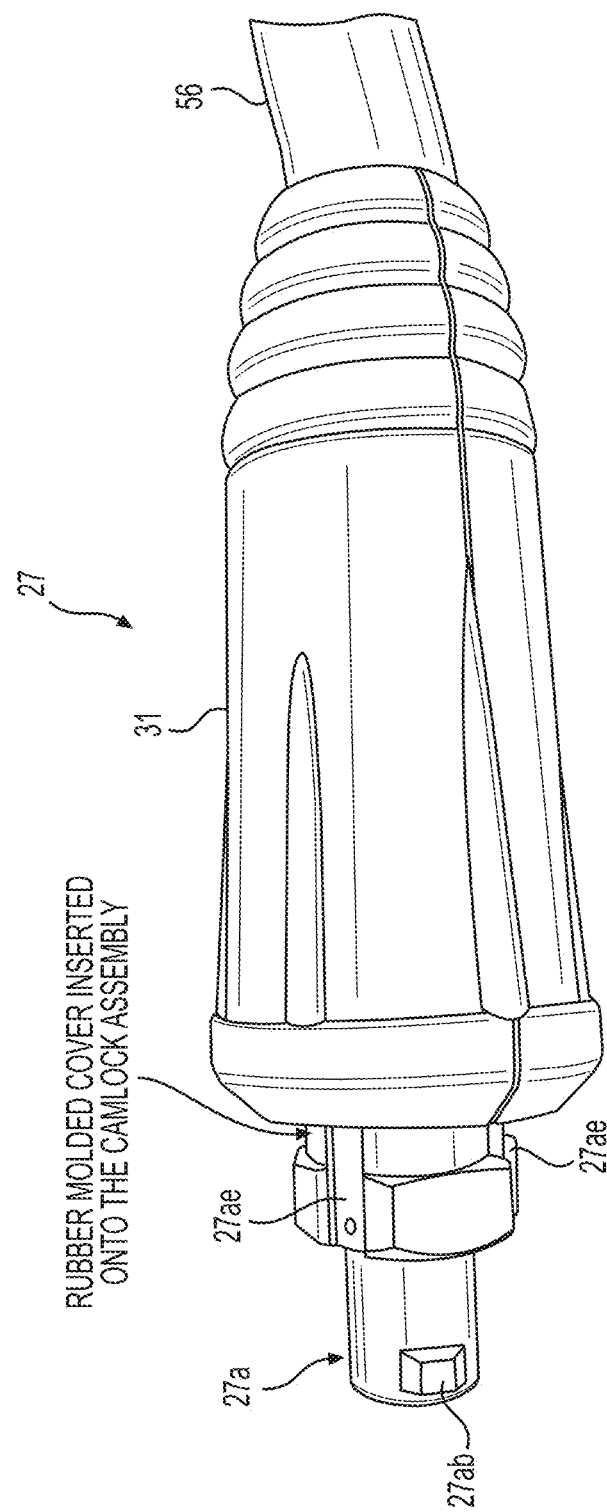
FIG. 39 is a partially assembled perspective view of the male cam-lock end of the cam-lock connecting device shown in FIG. 32.

The copper or aluminum sleeve 41 is fitted into the receptacle 27*ad* of the male cam-lock end 27*a*, as shown in FIG. 36. When the copper or aluminum sleeve 41 is fully inserted into the receptacle 27 of the male cam-lock end 27*a*, as shown in FIG. 37, then the Allen head fastener is threaded into the threaded hole 37 and tightened, as shown in FIG. 38.

It is noted that the inner end of the Allen head fastener makes an indent 45 (FIG. 35) when sufficiently tightened to firmly anchor the copper or aluminum sleeve 41 and inner conductor 56*a* of the battery cable 56 to mechanically and electrically connect the cable 56 to the male cam-lock end 27*a*.

The rubber molded cover 31 is provided with one or more inwardly extending protrusions 31*a* (FIG. 32) cooperating with one or more slots 27*ae* in an outer surface of the male cam-lock end 27*a* (FIG. 32).

Again, the male cam-lock end 27*a* and the female cam-lock end 27*b* are configured so as to tighten together when rotating the male cam-lock end 27*a* when inserted within the female cam-lock end 27*b*.

Figure 40:
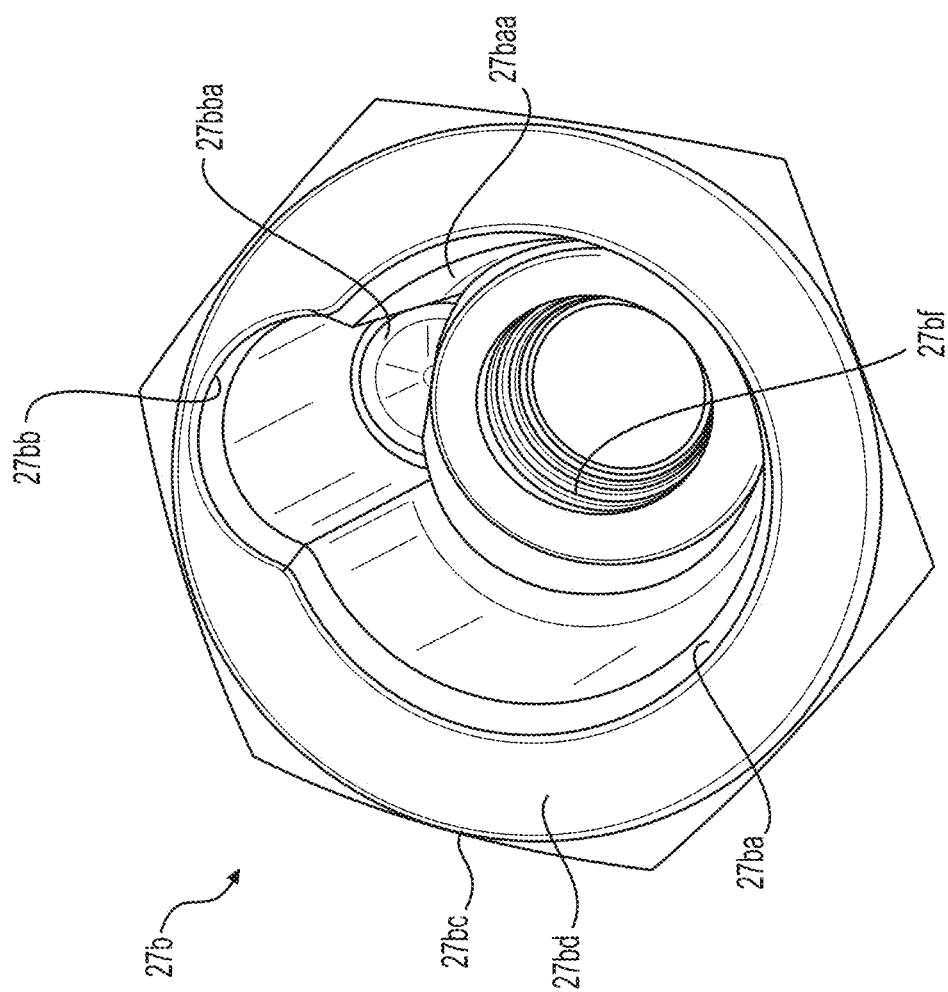
FIG. 40 is a disassembled perspective end view of the female cam-lock end of the cam-lock connecting device shown in FIG. 32.

The female cam-lock end 27*b*, as shown in FIG. 40, is provided with the receptacle 27*ba* and slot 27*bb* for accommodating the end of the male cam-lock end 27*a*. The slot 27*bb* is provided with a surface 27*bba* serving as a stop for the tooth 27*ab* of the male cam-lock end 27*a*. The receptacle 27*ba* is provided with inner threading 27*baa* for cooperating with the tooth 27*ab* of the male cam-lock end 27*a* to provide a threaded connection therebetween. Specifically, the tooth 27*ab* engages with the surface 27*bba* and is stopped from being further inserted into the receptacle 27*ba* of the female cam-lock end 27*b*. When the male cam-lock end 27*a* is rotated, the tooth 27*ab* engages and cooperates with the inner threading 27*baa* of the receptacle 27*ba* of the female cam-lock end 27*b* to begin tightening the male cam-lock end 27*a* within the female cam-lock end 27*b* with the tooth 27*ab* riding against an edge of the inner thread 27*baa*. The male cam-lock end 27*a* is further rotated to further tighten the connection with the female cam-lock end 27*b*. When the face 27*ac* (FIG. 32) of the male cam-lock end 27*a* engages with the face 27*bd* of the female cam-lock end 27*b*, then the cam-locks ends 27*a*, 27*b* are fully engage and rotation is stopped.

The female cam-lock end 27*b* (FIGS. 40 and 41) is provided with inner threading 27*bf* (FIG. 40) to accommodate the bolt 47 and lock washer 49 (FIG. 41) for connecting the female cam-lock end 27*b* to the battery jump starting device 10 (e.g. connects to base plate of smart switch 50 (FIG. 9)).

Figure 41:
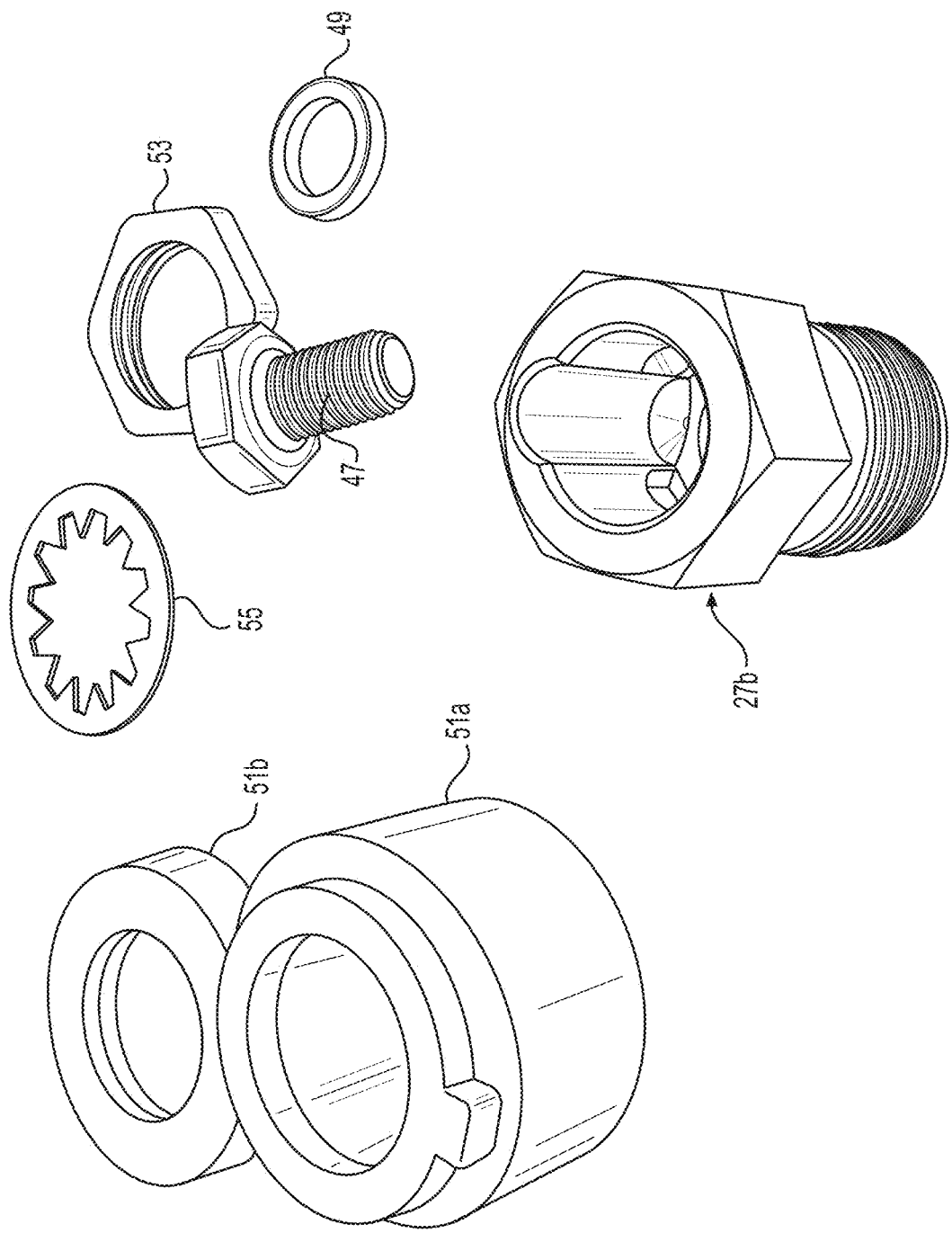
FIG. 41 is a disassembled perspective end view of the female cam-lock end of the cam-lock connecting device shown in FIG. 32.
Figure 42:
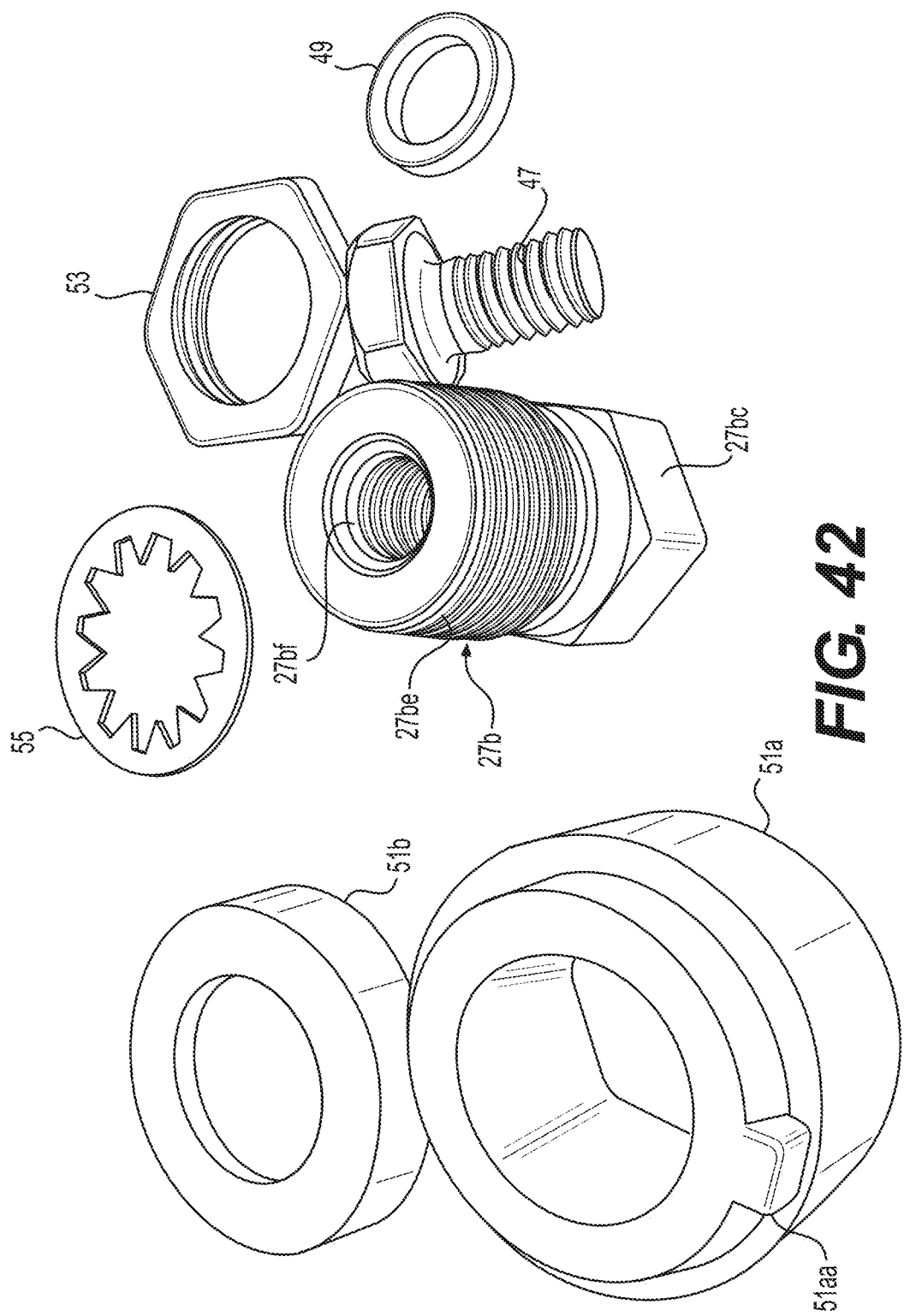
FIG. 42 is a disassembled perspective end view of the female cam-lock end of the cam-lock connecting device shown in FIG. 32.
Figure 43:
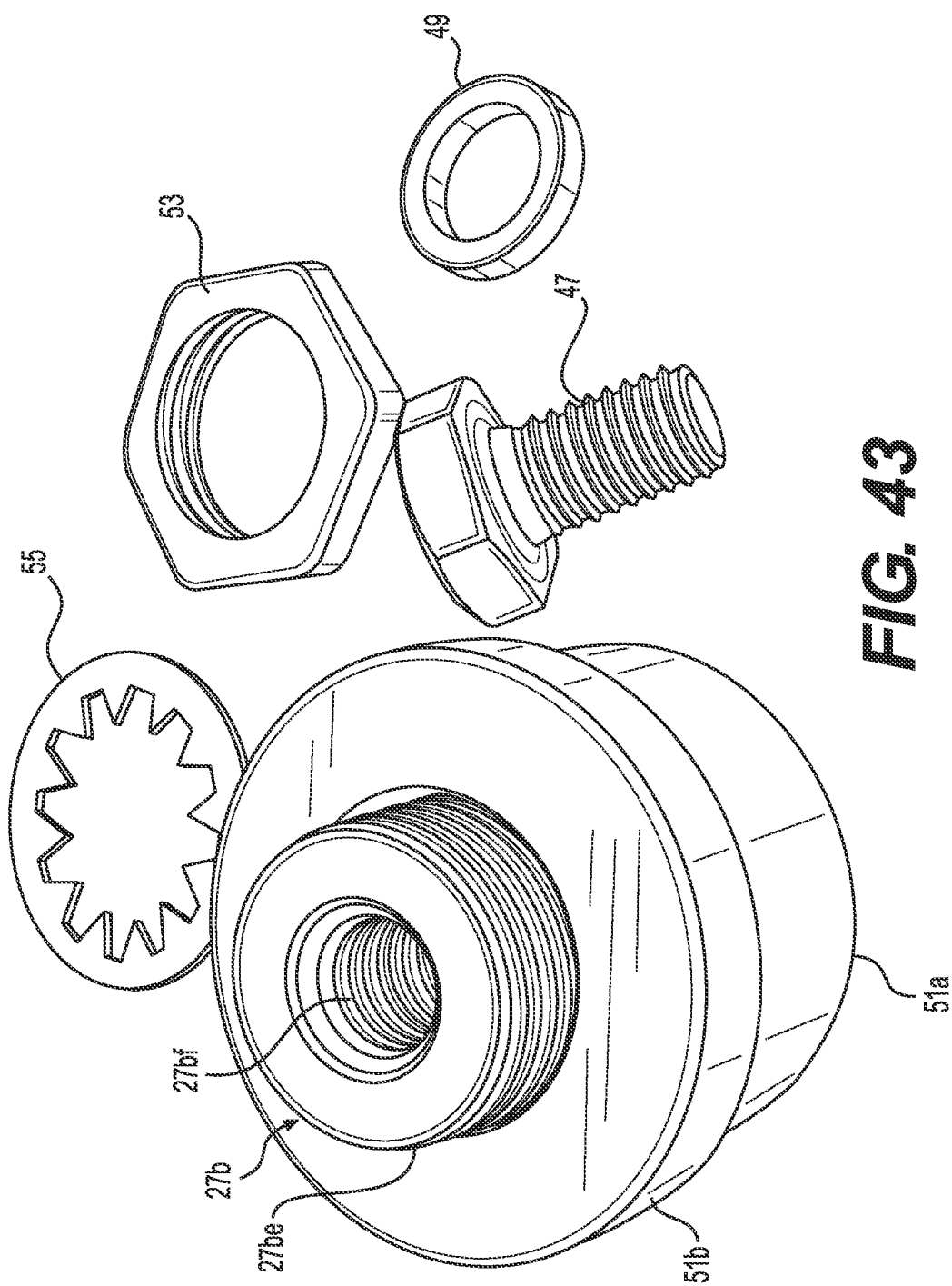
FIG. 43 is a partially assembled perspective end view of the female cam-lock end of the cam-lock connecting device shown in FIG. 32.

The female cam-lock end 27*b* is accommodated within a molded rubber cover portions 51*a*, 51*b*, as shown in FIGS. 41-43. The molded rubber cover portions 51*a*, 51*b* are fitted onto the threaded portion 27*be* of the female cam-lock end 27*b* (FIGS. 43-45), and then secured in place using nut 53 and lock washer 55. The molded rubber cover portion 51*a* includes an outwardly extending protrusion 51*aa*.

The invention claimed is:

1. A rechargeable jump starting device, comprising:
a rechargeable battery;
a positive battery cable;
a negative battery cable;
a positive highly electrically conductive cam-lock cable connecting device connected to the rechargeable battery, the positive highly electrically conductive cam-lock cable connecting device configured to attach and detach the positive battery cable to and from the rechargeable battery;
a negative highly electrically conductive cam-lock cable connecting device connected to the rechargeable battery, the negative highly electrically conductive cam-lock cable connecting device configured to attach and detach the negative battery cable to and from the rechargeable battery;
wherein the positive highly electrically conductive cam-lock cable connecting device and the negative highly electrically conductive cam-lock cable connecting device each comprise a female cam-lock end and a male cam-lock end that is insertable in the female cam-lock end, wherein a radius of a body of the male cam-lock end is substantially concentric with a radius of a body of the female cam-lock end when the male cam-lock end is inserted in the female cam-lock end, the positive highly electrically conductive cam-lock cable connecting device and the negative highly electrically conductive cam-lock cable connecting device being configured to tighten when the male cam-lock end is rotated within the female cam-lock end;
a positive battery clamp connected to the positive battery cable; and
a negative battery clamp connected to the negative battery cable.

2. The device according to claim 1, wherein the male cam-lock end and the female cam-lock end are made of highly electrically conductive material.

3. The device according to claim 1, wherein each male cam-lock end comprises a pin having a tooth and each female cam-lock end comprises a receptacle provided with a slot, wherein the receptacle of the female cam-lock end is configured to accommodate the pin and the tooth of the male cam-lock end.

4. The device according to claim 3, wherein the receptacle of the female cam-lock end is provided with internal threading for cooperating with the tooth of the male cam-lock end.

5. The device according to claim 4, wherein the male cam-lock end includes a first end face portion and the female cam-lock end includes a second end face portion, wherein the first and second end face portions engage each other when the male cam-lock end is inserted in the female cam-lock end and fully tightened.

6. The device according to claim 3, wherein the slot is provided with an inner surface serving as a stop for the tooth of the pin of the male cam-lock end.

7. The device according to claim 1, further comprising a rubber molded cover fitted over the male cam-lock end and another rubber molded cover fitted over the female cam-lock end.

8. The device according to claim 7, wherein the female cam-lock end is provided with an outer threaded portion and a nut for securing the rubber molded cover on the female cam-lock end.

9. The device according to claim 7, wherein the male cam-lock end is provided with one or more outwardly extending protrusions cooperating with one or more inner slots in the rubber molded cover.

10. The device according to claim 1, further comprising a highly electrically conductive rigid frame connected to the rechargeable battery, and wherein the positive highly electrically conductive cam-lock cable connecting device and the negative highly electrically conductive cam-lock cable connecting device are connected to the highly electrically conductive rigid frame.

11. The device according to claim 10, wherein the highly electrically conductive rigid frame at least partially encloses the rechargeable battery.

12. The device according to claim 10, wherein the highly electrically conductive rigid frame encloses the rechargeable battery.

13. The device according to claim 10, wherein the rechargeable battery is two Li-ion batteries, and wherein the highly electrically conductive rigid frame is connected to an electrical control configured to be selectively operated between a 12V position and 24V position.

14. The device according to claim 13, wherein the rechargeable jump starting device is configured to provide 12V or 24V jump starting modes.

15. The device according to claim 1, wherein the positive battery cable is configured to detachably connect to the male cam-lock end of the positive highly electrically conductive cam-lock cable connecting device and the negative battery cable is configured to detachably connect to the male cam-lock end of the negative highly electrically conductive cam-lock cable connecting device.

16. The device according to claim 15, further comprising:
a first set screw configured to secure the positive battery cable when the positive battery cable is attached to the male cam-lock end of the positive highly electrically conductive cam-lock cable connecting device; and
a second set screw configured to secure the negative battery cable when the negative battery cable is attached to the male cam-lock end of the negative highly electrically conductive cam-lock cable connecting device.

17. The device according to claim 16, wherein the male cam-lock end of the positive highly electrically conductive cam-lock cable connecting device comprises a first thread hole for accommodating the first set screw and the male cam-lock end of the negative highly electrically conductive cam-lock cable connecting device comprises a second thread hole for accommodating the second set screw.

18. The device according to claim 15, wherein the positive battery cable comprises a first conductive sleeve for electrically connecting to the male cam-lock end of the positive highly electrically conductive cam-lock cable connecting device and the negative battery cable comprises a second conductive sleeve for electrically connecting to the male cam-lock end of the negative highly electrically conductive cam-lock cable connecting device.

* * * * *

UNITED STATES PATENT AND TRADEMARK OFFICE
CERTIFICATE OF CORRECTION

| | | |
|---|---|---|
| PATENT NO. | : 11,804,724 B2 | Page 1 of 1 |
| APPLICATION NO. | : 17/091049 | |
| DATED | : October 31, 2023 | |
| INVENTOR(S) | : Jonathan Lewis Nook et al. | |

It is certified that error appears in the above-identified patent and that said Letters Patent is hereby corrected as shown below:

On the Title Page (Related U.S. Application Data) delete "which is a continuation of application No. PCT/US2018/003502" and insert --which is a continuation of application No. PCT/US2018/035029--

Signed and Sealed this
First Day of April, 2025

Coke Morgan Stewart
*Acting Director of the United States Patent and Trademark Office*